(12) United States Patent
Haynes

(10) Patent No.: US 10,081,947 B2
(45) Date of Patent: Sep. 25, 2018

(54) PERIPHERAL SEALING GLAND FOR ELONGATE OBJECTS PASSING THROUGH A SURFACE OR BEYOND A PIPE END

(71) Applicant: Andrew Leo Haynes, Auckland (NZ)

(72) Inventor: Andrew Leo Haynes, Auckland (NZ)

(73) Assignee: Lake Products Limited, Auckland (NZ)

( * ) Notice: Subject to any disclaimer, the term of this patent is extended or adjusted under 35 U.S.C. 154(b) by 0 days.

(21) Appl. No.: 14/864,197

(22) Filed: Sep. 24, 2015

(65) Prior Publication Data

US 2016/0010767 A1      Jan. 14, 2016

Related U.S. Application Data

(63) Continuation of application No. 12/084,142, filed as application No. PCT/NZ2006/000278 on Oct. 27, 2006, now Pat. No. 9,255,412.

(30) Foreign Application Priority Data

Oct. 27, 2005  (NZ) ........................................ 543300
May 18, 2006  (NZ) ........................................ 547348
Sep. 11, 2006  (NZ) ........................................ 549800

(51) Int. Cl.
  *E04D 13/14*   (2006.01)
  *F16L 21/05*   (2006.01)
  *F16L 5/10*    (2006.01)
(52) U.S. Cl.
  CPC ............ *E04D 13/1407* (2013.01); *F16L 5/10* (2013.01); *F16L 21/05* (2013.01)

(58) Field of Classification Search
  CPC ........ E04D 13/1407; F16L 21/05; F16L 5/10; F16L 5/02; H02G 3/22
  (Continued)

(56) References Cited

U.S. PATENT DOCUMENTS 2,510,362 A  *  6/1950  Anderson ............... F16D 3/224
                                                        464/175
D170,425 S       9/1953  Monahan, Jr.
(Continued)

FOREIGN PATENT DOCUMENTS

AU        199895218       6/1999
AU        200042690       1/2001
(Continued)

*Primary Examiner* — Eugene G Byrd
(74) *Attorney, Agent, or Firm* — Foley & Lardner LLP

(57) ABSTRACT

A peripheral sealing gland is configured to form a seal between an elongate member and a substantially flat surface having an aperture into which the elongate member extends. The sealing gland includes an at least partially frustoconical shaped skirt through which the elongate member is to pass and defining an upper seal structured to deform about and form a first seal to a periphery of the elongate member. The sealing gland includes a flange depending from a lower periphery of the skirt and having an endless lip seal, and a ring configured to bear on the flange so as to apply a pressure to the endless lip seal to form a second seal against the flat surface. The sealing gland includes a resealable split extending from the upper seal to a peripheral edge of the flange, and a compression clamp configured to close the resealable split, forming the first seal.

19 Claims, 25 Drawing Sheets

(58) Field of Classification Search
USPC ...... 277/603, 606–609, 634–636; 52/58, 199
See application file for complete search history.

(56) References Cited

U.S. PATENT DOCUMENTS

| | | | |
|---|---|---|---|
| 3,205,760 A * | 9/1965 | Seckerson | B60R 13/005 |
| | | | 411/548 |
| D216,693 S | 3/1970 | Dammer | |
| 3,566,738 A | 3/1971 | Cupit | |
| 3,602,530 A | 8/1971 | Elwart | |
| 3,654,965 A | 4/1972 | Gramain | |
| 3,677,576 A | 7/1972 | Gustafson | |
| 3,893,919 A * | 7/1975 | Flegel | E04D 13/0409 |
| | | | 210/166 |
| 3,977,137 A * | 8/1976 | Patry | E04D 13/1407 |
| | | | 285/42 |
| 4,120,129 A * | 10/1978 | Nagler | E04D 13/1407 |
| | | | 285/4 |
| D252,703 S | 8/1979 | Cupit | |
| 4,211,423 A | 7/1980 | Resech | |
| 4,333,660 A | 6/1982 | Cupit | |
| D269,454 S | 6/1983 | Houseman | |
| 4,449,554 A * | 5/1984 | Busse | F16L 59/161 |
| | | | 137/375 |
| 4,469,467 A * | 9/1984 | Odill | E02D 29/14 |
| | | | 277/607 |
| 4,519,793 A * | 5/1985 | Galindo | A61M 25/02 |
| | | | 128/DIG. 26 |
| 4,570,943 A | 2/1986 | Houseman et al. | |
| 4,625,469 A * | 12/1986 | Gentry | E04D 3/3601 |
| | | | 52/3 |
| 4,664,390 A * | 5/1987 | Houseman | E04D 13/1476 |
| | | | 277/606 |
| D292,233 S | 10/1987 | Schalle | |
| D292,234 S | 10/1987 | Schalle | |
| D294,177 S | 2/1988 | Sherlock | |
| 4,903,997 A | 2/1990 | Kifer | |
| D312,506 S * | 11/1990 | Schalle | D25/199 |
| 5,010,700 A * | 4/1991 | Blair | E04D 13/1476 |
| | | | 285/42 |
| 5,018,748 A * | 5/1991 | Schalle | E04D 13/1476 |
| | | | 277/634 |
| 5,036,636 A | 8/1991 | Hasty | |
| D321,565 S | 11/1991 | Schalle | |
| 5,176,408 A * | 1/1993 | Pedersen | E04D 13/1476 |
| | | | 285/419 |
| 5,222,334 A | 6/1993 | Hasty | |
| 5,226,263 A | 7/1993 | Merrin et al. | |
| 5,248,154 A | 9/1993 | Westhoff et al. | |
| 5,347,776 A * | 9/1994 | Skoff | E04D 13/1476 |
| | | | 52/199 |
| 5,414,964 A | 5/1995 | Bodycomb | |
| D364,933 S * | 12/1995 | Schalle | D25/199 |
| D370,274 S | 5/1996 | Menzies | |
| 5,588,267 A | 12/1996 | Rodriguez et al. | |
| D380,039 S | 6/1997 | Sutherland et al. | |
| 5,703,154 A | 12/1997 | Davis et al. | |
| 5,711,536 A | 1/1998 | Meyers | |
| D423,087 S | 4/2000 | Houseman | |
| 6,123,339 A | 9/2000 | Otsuji et al. | |
| D436,157 S | 1/2001 | Houseman | |
| 6,185,885 B1 * | 2/2001 | Thaler | E04D 13/1407 |
| | | | 285/42 |
| D447,222 S | 8/2001 | Mathers | |
| 6,409,178 B1 | 6/2002 | Raden et al. | |
| 6,471,217 B1 | 10/2002 | Hayfield et al. | |
| 6,752,176 B1 | 6/2004 | Price et al. | |
| 6,830,269 B1 | 12/2004 | Mayle | |
| 6,866,271 B2 * | 3/2005 | MacDonald | F16J 15/3276 |
| | | | 277/353 |
| 6,957,817 B2 | 10/2005 | Goll | |
| 7,021,878 B1 * | 4/2006 | Albertson | B27F 7/00 |
| | | | 403/27 |
| D525,685 S | 7/2006 | Walton | |
| 7,114,301 B2 | 10/2006 | Bibaud et al. | |
| 7,140,618 B2 * | 11/2006 | Valls, Jr. | F16L 21/03 |
| | | | 277/603 |
| D581,777 S | 12/2008 | Huang | |
| D585,968 S | 2/2009 | Elkins et al. | |
| D593,641 S | 6/2009 | Plank et al. | |
| 7,814,709 B1 | 10/2010 | Resech | |
| 8,141,303 B2 * | 3/2012 | McDow, Jr. | E04D 13/1476 |
| | | | 52/198 |
| 8,209,923 B1 | 7/2012 | Rich | |
| 8,453,389 B2 | 6/2013 | Selke et al. | |
| 8,608,206 B2 | 12/2013 | Fedale et al. | |
| 8,614,400 B2 | 12/2013 | Aldrich et al. | |
| D699,328 S | 2/2014 | Haynes | |
| 8,656,667 B2 | 2/2014 | Beall | |
| D722,621 S | 2/2015 | Gray et al. | |
| 9,206,928 B2 | 12/2015 | Haynes et al. | |
| 9,255,412 B2 | 2/2016 | Haynes | |
| D785,768 S | 5/2017 | Haynes et al. | |
| D796,013 S | 8/2017 | Haynes | |
| D796,014 S | 8/2017 | Haynes | |
| D796,074 S | 8/2017 | Bond | |
| D796,663 S | 9/2017 | Mitchell | |
| D801,487 S | 10/2017 | Haynes et al. | |
| 2004/0255523 A1 | 12/2004 | Bibaud et al. | |
| 2004/0262854 A1 | 12/2004 | Matczak et al. | |
| 2005/0055889 A1 * | 3/2005 | Thaler | E04D 13/1476 |
| | | | 52/58 |
| 2006/0145428 A1 | 7/2006 | Dudman | |
| 2006/0179725 A1 | 8/2006 | Chu | |
| 2006/0186607 A1 * | 8/2006 | Shih | F16J 3/045 |
| | | | 277/634 |
| 2007/0101664 A1 | 5/2007 | Hoy et al. | |
| 2007/0143956 A1 | 6/2007 | Kumakura et al. | |
| 2008/0092844 A1 | 4/2008 | Tsukamoto | |
| 2009/0302545 A1 | 12/2009 | Haynes | |
| 2010/0059941 A1 | 3/2010 | Beele | |
| 2010/0126530 A1 | 5/2010 | Welch et al. | |
| 2011/0140371 A1 | 6/2011 | Strydom | |
| 2011/0156354 A1 | 6/2011 | Egritepe et al. | |
| 2011/0266755 A1 | 11/2011 | Anderson et al. | |
| 2012/0126529 A1 | 5/2012 | Beall | |
| 2012/0297915 A1 | 11/2012 | Iwahara et al. | |
| 2013/0020796 A1 | 1/2013 | Humber | |
| 2013/0193652 A1 | 8/2013 | Whitley | |
| 2013/0328300 A1 | 12/2013 | Bond | |
| 2014/0084549 A1 | 3/2014 | Haynes et al. | |
| 2017/0059061 A1 | 3/2017 | Haynes et al. | |

FOREIGN PATENT DOCUMENTS

| | | | |
|---|---|---|---|
| AU | 199911298 | 2/2002 | |
| CA | 2104172 | 3/1994 | |
| DE | 296 13 258 | 9/1996 | |
| DE | 200 15 281 | 1/2001 | |
| DE | 103 58 668 | 3/2005 | |
| FR | 2862736 | 5/2005 | |
| WO | WO-88/09855 | 12/1988 | |
| WO | WO-98/09855 | 3/1998 | |
| WO | WO-2006/128790 | 12/2006 | |
| WO | WO 2006128790 A1 * | 12/2006 | F24C 15/00 |

* cited by examiner

PERIPHERAL SEALING GLAND FOR ELONGATE OBJECTS PASSING THROUGH A SURFACE OR BEYOND A PIPE END

CROSS-REFERENCE TO RELATED APPLICATIONS

This application is a continuation of and claims priority to U.S. patent application Ser. No. 12/084,142, entitled "Peripheral Sealing Gland for Elongate Objects Passing through a Surface or Beyond a Pipe End," filed on Feb. 10, 2009, which is a national stage entry of PCT/NZ2006/000278, filed on Oct. 27, 2006, which claims priority to New Zealand Patent Application No. 549800, filed on Sep. 11, 2006, New Zealand Patent Application No. 547348, filed on May 18, 2006, and New Zealand Patent Application No. 543300, filed on Oct. 27, 2005, each of which are incorporated herein by reference in their entirety and for all purposes.

FIELD OF INVENTION

The present invention relates to sealing glands and, in particular, though not solely to, sealing glands for sealing the join formed between and about an elongate member such as, for example, a pipe with a substantially flat surface, for example a wall, ceiling or floor, or another pipe that the pipe may pass through.

BACKGROUND OF THE INVENTION

Specific requirements for clean areas, for example, in food handling, biologically sensitive areas, or other such areas requiring a clean seal, requires use of a seal that can be cleaned easily, applied easily and become functional easily yet is also consistent in its sealing engagement to both the pipe and the wall, and that is manufactured from inert and chemically resistant materials, so as to not contaminate the immediate environment, and to withstand cleaning and the like. The same criteria apply when sealing a pipe to a further pipe that it may pass through. The further pipe may be an outer sleeve such as a kick pipe to prevent damage to the inner pipe. Such assemblies are often present where a pipe passes through a wall, floor or ceiling and the wall, floor or ceiling has an outer sleeve for the pipe to pass through.

There are numerous ways of sealing a cavity and join about pipes and similar elongate members to a flat surface which they may pass through. The most simple method for sealing a pipe to a wall is the application of sealant about the periphery of the pipe adjacent the region of the wall into or through which the pipe may pass through. Prior art methods that use sealants and similar are messy and time consuming and the sealant cannot be easily removed and replaced, meaning that the pipe, wall panel or similar cannot be easily removed and replaced.

Another example of these is the use of a stainless steel flange attached to the elongate pipe or member. This is then attached to the flat surface in a first method by standing this off the flat surface and then sealing the space with sealant. This is not an easily removable system. The second is the bolting of the flange to a further wall fitting and locating between the two a sealing component, e.g. an "O" ring. This method and the previous one do not stand up well to vibration and flexure of the pipe relative to the flat surface.

Further methods utilize boots and similar to engage both the pipe and wall. Other methods use a boot with a cut to allow it to be placed and seal an existing pipe and wall installation. Methods that have used boots to date have not resulted in a consistently sealing boot about the pipe and against the bulk head. The solutions that currently exist with a sealable cut for sealing about an existing pipe and wall share the same problems as the uncut ones together with the added problem that the cut does not seal consistently either. To date all re-sealable glands require the addition of sealant to obtain an effective seal.

A number of solutions exist for sealing a pipe to a protective sleeve. However all of these require some form of additional sealant added to affect a proper seal between the pipe and the protective sleeve.

Increasingly hygienic environments, for example food handling and preparation premises, require high standard chemically inert materials to be present. This is not only to preserve the hygienic environment but also the method of cleaning such places uses highly corrosive clean in place chemicals that attack most materials such as rubbers and steels, including 305 stainless steel. These chemicals or environments are also often thermally elevated, increasing their reactivity. Such environments require materials that are compatible with such harsh environments.

Additionally such environments require a vibration and flexure resistant sealing and often fire retardance and resistance. Such relative movement can occur due to impact of the pipe or surface, flow in the elongate member, water or gas hammer or thermal expansion. The relative movement can be both radially and axially of the elongate member. To date, no such gland exists that offers all these properties and there is a long felt want in the industry that as yet has not been addressed.

In this specification, where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art. It is, therefore, an object of the present invention to provide a sealing gland to overcome the above problems with the prior art or at least to provide the public with a choice.

BRIEF DESCRIPTION OF THE INVENTION

A first aspect of the present invention may be said to broadly consist in a peripheral sealing gland to form a seal, between an elongate member and a substantially flat surface having an aperture into which said elongate member extends said peripheral sealing gland comprising or including an at least in part tapered or frustoconical shaped skirt through which said elongate member is to pass and defining at the upper periphery of the skirt, a deformable upper seal to deform about and seal to a periphery of said elongate member, a flange depending from the lower periphery of said skirt including on its outward from the skirt presented surface, at least one endless lip ("endless lip seal"), to seal when brought into contact against said substantially flat surface, a compression ring able to bear on said flange, to be fastened to said substantially flat surface to capture the flange therebetween. Preferably, said seal formed is water and particulate impervious.

Preferably, said compression ring is rigid so as to apply a substantially consistent pressure to said at least one endless lip against said surface. For instance, the compression ring may be made from a stainless steel. The compression ring includes a first plurality of apertures for receiving fasteners. The flange includes a second plurality of apertures, at least some of which are co-axial with the first plurality. Preferably, said second plurality of apertures is each of lesser size than the fastener to fit there through to aid establishing of a seal. Preferably, said second plurality of apertures does not pass through said endless lip seals.

Preferably, there are at least two of said endless lip seals, each concentric to each other. In one embodiment, there are four of said endless lip seals. The second plurality of apertures may lie between two of the concentric endless lip seals. Preferably, the outer most of said plurality of endless lip seals is larger than those at the inside of it.

Preferably, the upper seal and the flange are of elastic resilient material and preferably chemically inert material (for example silicone). The upper seal may be defined by cutting the apex of a conical shaped skirt that preferably has marking to indicate a zone of cutting for particular said elongate members. The upper seal and the flange may be of sufficient internal diameter to seal over any diameter enlargement in the elongate member. Such diameter enlargement may be affected by welding, union nuts, or similar known methods and also the size of the aperture in the substantially flat surface to be sealed.

The skirt and the flange may be integrally formed. Preferably, the skirt has, toward said flange, a retention flange to bear on a surface of the compression ring to retain the compression ring to the flange.

In one embodiment, said sealing gland is split, from said upper seal to the external edge of said flange. In this embodiment, the sealing gland can be applied to form a seal between an in situ elongate member and a substantially flat surface by opening the split and slipping the gland laterally over the elongate member and thereafter applying pressure to close the split. There may be a continuous upstand depending outwards from the skirt on each side of the re-sealable split. There may also be an undercut or retaining groove running along each of the external surfaces of the continuous upstand. The compression ring may be split to under engage and apply sealing pressure at least along part of the re-sealable split on the flange.

Preferably, there is a compression clamp able to apply pressure to either side of the remainder of the re-sealable opening at said undercut by continuous contact on either side of the re-sealable opening. Said compression clamp may comprise at least two spaced opposing closure members, said two spaced opposing closure members joined by a plurality of connection members along their length, said plurality of connection members arching from one of said at least two spaced opposing closure members to the other, wherein in use said at least two spaced opposing closure members are in continuous contact with external surfaces on either side of said continuous upstand to apply pressure to seal said re-sealable split.

In a further aspect the present invention is a sealing gland to present a first sealing surface about the periphery of an elongate member and a second sealing surface to present a labyrinth seal to a substantially flat surface said first sealing surface retained to said periphery by elastic tension thereabout, and said second sealing surface retained to said substantially flat surface by a compression ring and a plurality of fasteners there though. The first sealing surface may depend from an inner surface of a skirt. The second sealing surface may depend from a flange which in turn depends from a lower portion of said skirt.

In another aspect, the present invention may be said to broadly consist in a peripheral sealing gland which in use forms a seal between an elongate member and a surface, said peripheral sealing gland comprising or including a substantially conical or pyramidal upper part (whether or circular or 3 or more sided polygon in cross section), the lower periphery of said upper part defining the perimeter of a lower aperture, a sealing flange extending outwards from the lower periphery of said upper part, in use, said upper part being cut across a plane to create an upper aperture in said upper part, said elongate member passing through at least said upper aperture, the periphery of said upper aperture forming an upper seal which deforms about and seals to the outer surface of said elongate member, said sealing flange locating against said surface to form a lower seal.

Preferably said plane is generally horizontal, so that when cut, said upper part has the form of a conical frustum or truncated pyramid. The upper part may be marked at intervals over the height of said upper part to indicate zones across which said upper part can be cut to form said upper aperture, said marks located so that when said upper part is cut at a specific zone, said upper aperture is sized to fit a particular size of elongate member.

The sealing flange may include at least one endless lip seal located on the lower surface of said flange which in use seals against said surface. Preferably, there is a plurality of lip seals located on said lower surface of said flange, positioned concentrically. For instance, there may be four of said endless lip seals. Preferably, the outermost of said plurality of endless lip seals is larger than those at the inside of it.

The sealing gland may be adapted to receive a compression ring which in use bears on the upper surface of said sealing flange in order to seal against said surface. The upper part may include a retention flange located substantially where said upper part and said sealing flange meet, said retention flange sized and located such that in use it bears on the upper surface of said compression ring to retain said compression ring in position on said sealing flange. Preferably, the seal between said surface and said sealing flange is water and particulate impervious. Preferably, said sealing gland is of elastically resilient and chemically inert material (for example silicone).

In a further aspect, the present invention may be said to broadly consist in a sealing gland assembly comprising or including a sealing gland according to any one of the preceding statements, and a compression ring which in use bears on the upper surface of said sealing flange in order to aid sealing of said flange against said surface.

The compression ring includes a plurality of compression apertures, spaced around said compression ring, which are adapted to receive fasteners that engage with said surface such that in use said ring bears on said upper surface of said sealing flange. Preferably, said compression ring is sufficiently rigid so as to not deform in use. For instance, the compression ring may be made from a stainless steel.

The sealing flange may include a plurality of flange apertures positioned so that in use they co-locate with said plurality of compression apertures on said compression ring. The flange apertures may each be of lesser size than the compression apertures, to in use aid said sealing when said fasteners pass though said flange apertures. Preferably, the second plurality of apertures does not pass through the endless lip seals. Preferably, the second plurality of apertures lies between two concentric endless lip seals.

Preferably, said upper part and said flange are of sufficient internal diameter that any diameter enlargement in said elongate member will not break said upper seal. Such diameter enlargement may be affected by welding, union nuts, or similar known methods.

In a further aspect the present invention consists in a seal in situ formed between an elongate member and a substantially flat surface by a peripheral sealing gland, said peripheral sealing gland comprising or including an at least in part frustoconical shaped skirt through which said elongate member is to pass and defining at the upper periphery of said skirt a deformable upper seal to deform about and seal to a periphery of said elongate member, a flange depending from the lower periphery of said skirt including on its outward from the skirt-presented surface, at least one endless lip ("endless lip seal"), to seal when brought into contact, against said substantially flat surface, and a compression ring able to bear on said flange by fasteners to engage with said substantially flat surface to capture said flange therebetween.

Preferably, said peripheral sealing gland is unitary and is located about said elongate member prior to sealing against said substantially flat surface. Alternatively, said peripheral sealing gland is located about said elongate member and substantially flat surface in situ via a re-sealable split running from said upper seal to an external surface of said flange.

In yet a further aspect the invention consist in peripheral sealing gland as herein described with reference to the accompanying drawings.

In yet a further aspect still the invention consists in a method of providing a sealing gland as herein described with reference to the accompany drawings.

In yet a further aspect the present invention consists in situ a pipe and a wall sealed by a peripheral sealing gland as herein described with reference to any one or more of the accompanying drawings.

In a further aspect, the present invention may be said to broadly consist in a sealing gland which in use forms a first seal between the outer surface of a first elongate member and said sealing gland, and a second seal between the outer surface of a second elongate member and said sealing gland, said sealing gland comprising or including a hollow conical or pyramidal upper section (whether or circular or 3 or more sided polygon in cross section), a hollow tubular lower section (whether circular or of other cross section) extending from the base of said upper section, the free end of said lower section including a lower aperture, in use, said upper part being cut across a plane to create an upper aperture, said first elongate member in use passing through said upper aperture, the periphery of said upper aperture forming an upper seal which deforms about, and seals to, the outer surface of said first elongate member, and one end of said second elongate member in use passing into said lower aperture, at least part of said lower section deforming about and sealing to the outer surface of said second elongate member.

Preferably said plane is generally horizontal, such that after said cut, said upper part has the form of a conical frustum or truncated pyramid. The upper section may include cut marks at intervals over the height of said upper section.

Preferably, said sealing gland is adapted to receive a tensile band which in use bears on the outer surface of said lower section in order to seal against said outer surface of said second elongate member. The lower section may include at least one endless lip seal located on the inner surface of said lower section which in use seals against said outer surface of said second elongate member. Preferably, said first elongate member is of lesser diameter than said second elongate member.

Preferably, the seals between said surface and said sealing flange are water and particulate impervious. The sealing gland may be made of elastically resilient and chemically inert material (for example silicone). The lower end may include a thickened band towards its lower portion. Preferably said thickened band reinforces said lower end to prevent tearing of the gland material. Additionally, said thickened band may provide a reference for locating said tensile band.

In a further aspect the present invention consists in a seal in situ formed between a first elongate member and a second elongate member by a peripheral sealing gland, said peripheral sealing gland comprising or including a hollow conical or pyramidal upper section and a hollow tubular lower section extending from the base of said upper section, the free end of said lower section including a lower aperture, in use, said upper part having or able to have an upper aperture, said first elongate member in use passing through said upper aperture, the periphery of said upper aperture forming an upper seal which deforms about, and seals to, the outer surface of said first elongate member, and one end of said second elongate member in use passing into said lower aperture, at least part of said lower section deforming about and sealing to the outer surface of said second elongate member.

In a further aspect the present invention consists in a peripheral sealing gland to seal any gap between a substantially flat surface and an elongate member, said peripheral sealing gland comprising or including an at least in part frustoconical shaped skirt able to define or including an aperture formed towards its uppermost point to define an upper seal to be located about the periphery of said elongate member, and a flange depending from the lowermost periphery of said at least in part frustoconical shaped skirt, the lower most surface of said flange having at least one endless lip to seal ("endless lip seal") when brought into contact against said substantially flat surface. Preferably, said skirt and said flange are of one piece. The sealing gland also includes a re-sealable split extending from said uppermost point to an external edge of said flange, such that said peripheral sealing gland can be opened and located about said elongate member and against said substantially flat surface and thereafter said re-sealable split can be sealed by a combination of a split compression ring able to bear on said flange by fasteners to engage with said substantially flat surface and able to seal at least that part of said re-sealable opening on said flange, and a compression clamp able to apply sealing pressure either side of the remainder of said re-sealable split by continuous contact on both sides of said re-sealable split. Preferably, said seal formed is water and particulate impervious.

Preferably, said compression clamp has two parallel rails able to locate either side of said re-sealable split to apply said pressure to seal said split. The re-sealable split "on" or "of" said skirt can receive said compression clamp if necessary to provide additional sealing pressure. Preferably, said compression clamp is located into place by sliding along said re-sealable split from one end. Preferably, said compression damp is slid along from said uppermost point. Preferably, said compression clamp has connection portions that arc from one of said two parallel rails to the other. Preferably, said compression clamp is made from stainless steel, such as 316 or higher grade stainless steel.

Preferably, said split is flanked by mating surfaces of said skirt. The mating surfaces may be formed by continuous upstands. The mating surfaces of said upstands may be complimentary. Preferably, said mating surfaces on each of said continuous upstands present a complimentary mating surface to each other to form the seal, when under pressure, of said re-sealable opening. Preferably said complimentary mating surface is a planar surface. Alternatively said complimentary mating surface is a labyrinth sealing surface. Preferably, said labyrinth sealing surface consists of at least one sealing lip on at least one of said complimentary mating surfaces. Preferably there is a complimentary seal recess to receive said at least one sealing rib on the opposing said complimentary mating surface.

Each of the continuous upstands may include an external surface opposed to said mating surface. The external surface of each said continuous upstand may include an undercut ("said undercuts") to receive said parallel rails. The compression clamp may be clipped down over said re-sealable split to locate with said undercuts. The compression clamp may then be deformed inwards to apply said pressure to seal said re-sealable split. The inward deformation may occur via a tool applied to either said connection portions or said parallel rails. Preferably, said compression clamp is also deformable to contour to the shape of said peripheral sealing gland.

Preferably said peripheral sealing gland has a pre-formed said upper seal. Alternatively, said upper seal is formed by cutting part of said upper most point away. Preferably said upper seal and said flange are of elastic resilient material. Preferably said upper seal and flange are of sufficient internal diameter to seal over any diameter enlargement in said elongate member. Such diameter enlargement may be affected by welding, union nuts, or similar known methods.

Preferably said peripheral sealing gland is made from a fire retardant material. Preferably said peripheral sealing gland is made from a thermally resistant material. Preferably said peripheral sealing gland is made from a highly flexible material. Preferably said peripheral sealing gland is made from a chemically inert material (for example silicone). Preferably said peripheral sealing gland is circular in cross-section.

Preferably, the elongate member is at 90 degrees to said substantially flat surface. Alternatively, the elongate member may be at any angle to said substantially flat surface. Preferably, said elongate member is circular in cross-section. Preferably, said upper most point is marked circumferentially to indicate apertures to suit various elongate members.

Said compression ring may include a first plurality of apertures for receiving said fasteners. Preferably said compression ring is sufficiently rigid so as to not deform under the pressure exerted by said fasteners to press said endless lips against said surface. For instance, said compression ring may be made from a stainless steel, such as 316 or higher grade stainless steel. Preferably said skirt has, toward and above said flange, a retention flange to bear on a surface of said compression ring to retain said compression ring to said flange.

Said flange may have a second plurality of apertures, at least some of which are co-axial with said first plurality. Preferably said second plurality of apertures do not pass through said endless lip seals. Preferably said second plurality of apertures is each of lesser size than said fastener to fit there through to aid said sealing. Preferably there is a plurality of said at least one endless lip seal each concentric to each other. Preferably there are four said endless lip seals. Preferably the outer most of said plurality of endless lip seals is larger than those at the inside of it. Preferably said second plurality of apertures lie between two concentric endless lip seals.

In a further aspect still the present invention consists in a method of providing a seal between an elongate member and a substantially flat surface with a sealing gland having an at least in part frustoconical skirt shaped upper section to provide an upper seal against said elongate member, and a flange dependent from the lower periphery of said at least in part frustoconical skirt shaped upper section to seal against aid substantially flat surface, comprising or including the steps of i) locating said sealing gland about said existing elongate member via a re-sealable opening of said sealing gland running from said upper seal to said flange, and above or adjacent to said substantially flat surface, ii) locating a compression ring about said sealing gland on said flange to seal that part of said re-sealable opening present on said flange, iii) locating a compression clamp on the remainder of said re-sealable opening to be in continuous contact with the outer surfaces of said re-sealable opening, and iv) applying sealing pressure via said continuous contact with said outer surfaces by said compression clamp to seal said re-sealable opening, said compression ring bearing on said flange by fasteners engaging with said substantially flat surface.

The compression clamp may slide over said re-sealable opening. Alternatively said compression clamp is clipped over said re-sealable opening. The compression clamp may be deformed in place to provide said sealing pressure to seal said re-sealable opening. The compression clamp may be deformed inwardly. The compression clamp can deform to contour to said skirt.

In a further aspect the present invention consists in a seal in situ formed between an elongate member and a substantially flat surface by a peripheral sealing gland, said peripheral sealing gland comprising or including an at least in part frustoconical shaped skirt able to have or having an aperture formed towards its uppermost point to define an upper seal about the periphery of said elongate member, and a flange depending from the lowermost periphery of said at least in part frustoconical shaped skirt, the lower most surface of said flange having at least one endless lip to seal ("endless lip seal"), when brought into contact, against said substantially flat surface, a re-sealable split through the thickness of said peripheral sealing gland extending from said uppermost point to the external edge of said flange, such that said peripheral sealing gland can be opened and located about said elongate member and against said substantially flat surface and there-after said re-sealable split can be sealed by a combination of a split compression ring able to bear on said flange-by fasteners to engage with said substantially flat surface and able to seal at least that part of said re-sealable opening on said flange, and a compression clamp able to apply sealing pressure either side of the remainder of said re-sealable opening by continuous contact either side of said re-sealable opening.

In a further aspect still the present invention consists in a compression clamp for closing retaining and sealing two halves of an elongate opening, said compression clamp comprising or including at least two opposing pressure application surfaces, that at least prior to application are parallel, said at least two opposing pressure application surfaces presenting each from a pressure application member, said each pressure application member being joined by a plurality of connection members arching between said pressure application members, said compression clamp when located about said elongate opening applying a continuous sealing pressure along the length of said elongate seal.

In a further aspect still the present invention consists in a compression clamp to close an elongate opening to form an elongate seal, said elongate seal being formed by two opposing seal faces, whether said opposing seal faces follow a curved or straight line, and whether or not the faces form a planar or labyrinthine seal, said compression clamp comprising or including, at least two spaced opposing closure members, said two spaced opposing closure members joined by a plurality of connection members along their length, said plurality of connection members arching from one of said at least two spaced opposing closure members to the other, wherein in use said at least two spaced opposing closure members are in continuous contact with external surfaces either side of said elongate opening to apply pressure to form said elongate seal. The lower external surfaces of said connection members may be cutaway to present a smooth surface to said gland material should they contact it.

Preferably said two spaced opposing closure members are located in undercuts at least partway down the height of said elongate seal. Preferably said undercuts are pre-formed in said external surfaces. Alternatively said undercuts are formed by the said applied pressure by said compression clamp. Preferably said compression clamp slides into place along said elongate opening. Alternatively said compression clamp is clipped over said elongate opening. Preferably said elongate opening is the re-sealable opening of a sealing gland. Preferably said sealing gland is a sealing gland as herein before described.

Preferably said compression clamp is deformed in place to provide said applied pressure to seal said elongate opening. Preferably said compression clamp is deformed inwardly. Preferably said compression clamp is removable to allow unsealing of said elongate opening. Preferably said compression clamp is able to deform to follow the contour of said elongate opening forming said elongate seal. Preferably said compression clamp is made from stainless steel.

In another aspect, the invention consists of a crimpable clamp having two (at least in part and preferably totally) spaced elongate members interconnected by bridging, wherein the bridging allows (without total memory or any memory of the crimp) crimping of the bridging to bring all or part of this spaced elongate members together.

Preferably the material of the bridging is such that the bridging assumes a stable fixed condition after having sprung back not at all or only a little after the insult which has caused the crimp. Preferably the bridging is a plurality of discrete ridges. Preferably they do not lead directly from one elongate member to the other i.e. by the shortest distance. Instead, whereas is preferable, said elongate members are straight, preferably each bridge is offset from the plane that includes both said spaced elongate members. Preferably each bridge projects at a direction more normal than parallel to the direct direction of one elongate member to the other, there being however part of the bridging which where the curved or straight is more akin to the direct direction from elongate member to elongate member.

In a further aspect, the present invention consists in an assembly whereby two components or two parts of a component are held together by a crimpable clamp as before said having been crimped so as to retain the components or parts together.

In a further aspect, the invention consists in a gland, suitable for whole and/or part encirclement of a member whether a conduit, port or the like, wherein said gland includes a separation of part thereof, said separation being able to be held together or at least almost together, there being outstands from each portion, part or the like which allows one to be clamped one to the other. Preferably said outstands are adapted for being clamped by a crimpable clamp as before said.

Preferably said gland includes an annular flange, a sleeve and a zone between said sleeve and said annular flange, there being a splitting of a radial or near radial splitting of the annular flange and also of the zone therefrom approaching or to said sleeve, and wherein said zone includes outstands adapted to be held one to the other to hold the separation closed or substantially closed over at least said zone or part thereof. Preferably said zone is at least to some extend substantially frustoconical or a progression of frustoconical or related curved forms. Preferably the separation is a separation provided at a moulding stage (i.e., it is not a post moulding or machining separation).

Preferably, said annular flange is provided with openings so that the same can be affixed as appropriate using some or all of those openings, thereby preferably also holding that annular flange in a mated or near mated condition that affects substantial closure or closure.

In still a further aspect, the present invention consists in a sealing gland to seal about a substantially elongate member and a substantially flat surface that includes an aperture into which the member extends, comprising or including a substantially planar sealing body adapted to form, toward the centre of said sealing body, a seal about said elongate member, said seal formed at least in part by elastic deformation about said elongate member, and toward the periphery of said sealing body at least one endless lip seal adapted to seal to said substantially flat surface. Preferably, there are four said endless lip seals each concentric toward said periphery. The sealing gland also includes a first plurality of holes inward of said periphery, and a compression ring to bear, on said periphery, on the surface opposite that against said substantially flat surface, said compression ring having a plurality of holes co-axial with those of said first plurality of holes, said first plurality of holes providing an interference fit to seal against a fastener passed therethrough.

Preferably said sealing body has a retention lip on said surface opposite that against said substantially flat surface to retain said compression ring to said sealing body. Preferably said interference fit is created independent of any compression achieved by said compression ring. Preferably a plurality of fasteners are used to retain said sealing gland to said substantially flat surface, via said compression ring, and said plurality of apertures, said fasteners engaging with said substantially flat surface. Preferably said compression ring is rigid so as to not substantially deform under the pressure applied by said fasteners.

Preferably said sealing body has a plurality of concentric indications at or toward the centre of said body to indicate various sealing aperture sizes that can be cut into said sealing body to deform about and accommodate different sized elongate members. Preferably, said concentric indications and said sealing aperture are circular. Alternatively, said concentric indications and said sealing aperture are other than circular to accommodate the cross sectional shape of said elongate member.

Preferably, said sealing body has a sealing aperture therethrough at the centre of said sealing body to seal about said elongate member. Alternatively, said sealing body has no said sealing aperture at the centre there through and a user will cut the sealing aperture as required for the said elongate member. Preferably, said sealing body is made from a fire retardant silicone material. Preferably, said sealing body is made of a red fire retardant silicone material to indicate its presence as a sealing gland.

In a further aspect, the present invention consists in a sealing gland to seal against a substantially flat surface and about a substantially elongate member, comprising or including an inner sealing body adapted to seal against said substantially flat surface, and an outer sealing body to mount against said inner sealing body, both said sealing bodies to seal about said elongate member, said inner sealing body being substantially planar having a planar peripheral flange ("inner sealing body flange") with at least one first endless lip seal at or near its periphery to bear on said substantially flat surface. Preferably, there are four said endless lip seals each concentric toward the outer perimeter. Inward of said inner sealing body flange is an inner sealing portion, said outer sealing body having a substantially frustoconical inner sealing portion and a peripheral flange ("outer sealing body flange") on its base thereabouts, the underside of said outer sealing body flange having at least one second endless lip seal to bear against said inner sealing body.

According to this embodiment, the sealing gland also includes a compression ring to bear against the top side of said outer body peripheral flange, a plurality of apertures passing through said compression ring and said inner and outer body sealing flanges, adapted to receive fasteners therethrough, said plurality of apertures providing an interference fit about said fasteners to seal thereto, said inner sealing portions adapted to elastically deform about said elongate member to seal thereto, said compression ring able to bear on said top side by tightening of said fasteners to said substantially flat surface, to seal said outer body sealing flange via deformation of said at least one second endless lip seal to said inner body sealing flange, and said inner body sealing flange to said substantially flat surface via deformation of said at least one first endless lip seal. Preferably, said compression ring is substantially rigid to not deform under the pressure applied by the fasteners to attach and seal said sealing gland to said substantially planar surface. Preferably, said interference fit is caused independent of any compression achieved by compression of each said sealing body by compression ring. Preferably, said outer sealing body has a retention lip on said top side surface to retain said compression ring to said outer body.

Preferably, each said sealing body has a plurality of concentric indications at or toward the centre of each said sealing body to indicate various sealing aperture sizes that can be cut into said sealing body to deform about, seal to and accommodate different sized elongate members. Preferably, said concentric indications and said sealing aperture are circular. Alternatively, said concentric indications and said sealing aperture are other than circular to accommodate the cross sectional shape of said elongate member.

Preferably, each said sealing gland has a sealing aperture therethrough at the centre of each said sealing body to seal about said elongate member. Alternatively, each said sealing body has no said sealing aperture at the centre there through and a user will cut the sealing aperture as required for the said elongate member. Preferably, each said sealing body is made from a fire retardant silicone material. Preferably, said inner sealing body is made of a red fire retardant silicone material to indicate it has been applied.

Preferably the arrangement is substantially as herein described with reference to any one of the accompanying drawings. The invention also consists in, in combination, a gland as before said and a crimpable clamp as before said. The term 'comprising' as used in this specification means 'consisting at least in part of', that is to say when interpreting statements in this specification which include that term, the features, prefaced by that term in each statement, all need to be present but other features can also be present. The term "gland" as used herein includes the meaning of a member to seal between two surfaces, typically where one intrudes into, or near another surface or one member passes through another member or surface. The term "continuous" here is meant in the normal meaning of continuous over time and also includes continuous over a length.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting. The invention consists in the foregoing and also envisages constructions of which the following gives examples.

BRIEF DESCRIPTION OF THE DRAWINGS

Preferred embodiments to the present invention will now be described in reference to the accompanying drawings, whereby;

FIG. 21 shows a further embodiment of the present invention in a) plan view and b) a cross-sectional view through A-A the particular form being of a substantially planar disk with an aperture there through.

DETAILED DESCRIPTION

Preferred embodiments of the present invention will now be described with reference to FIGS. 1 through 34.

The sealing gland 1 consists of a tapered skirt 5 that is substantially frustoconical in the preferred embodiment. It should be noted that in alternative embodiments this skirt 5 could be pyramid-shaped, with multiple sides from three upwards. The size of the skirt 5 will depend on the location it is to seal. The sizes will determined by the size and presence of any pipe unions present or the size of the aperture through which the pipe 2 may pass through.

Figure 1:
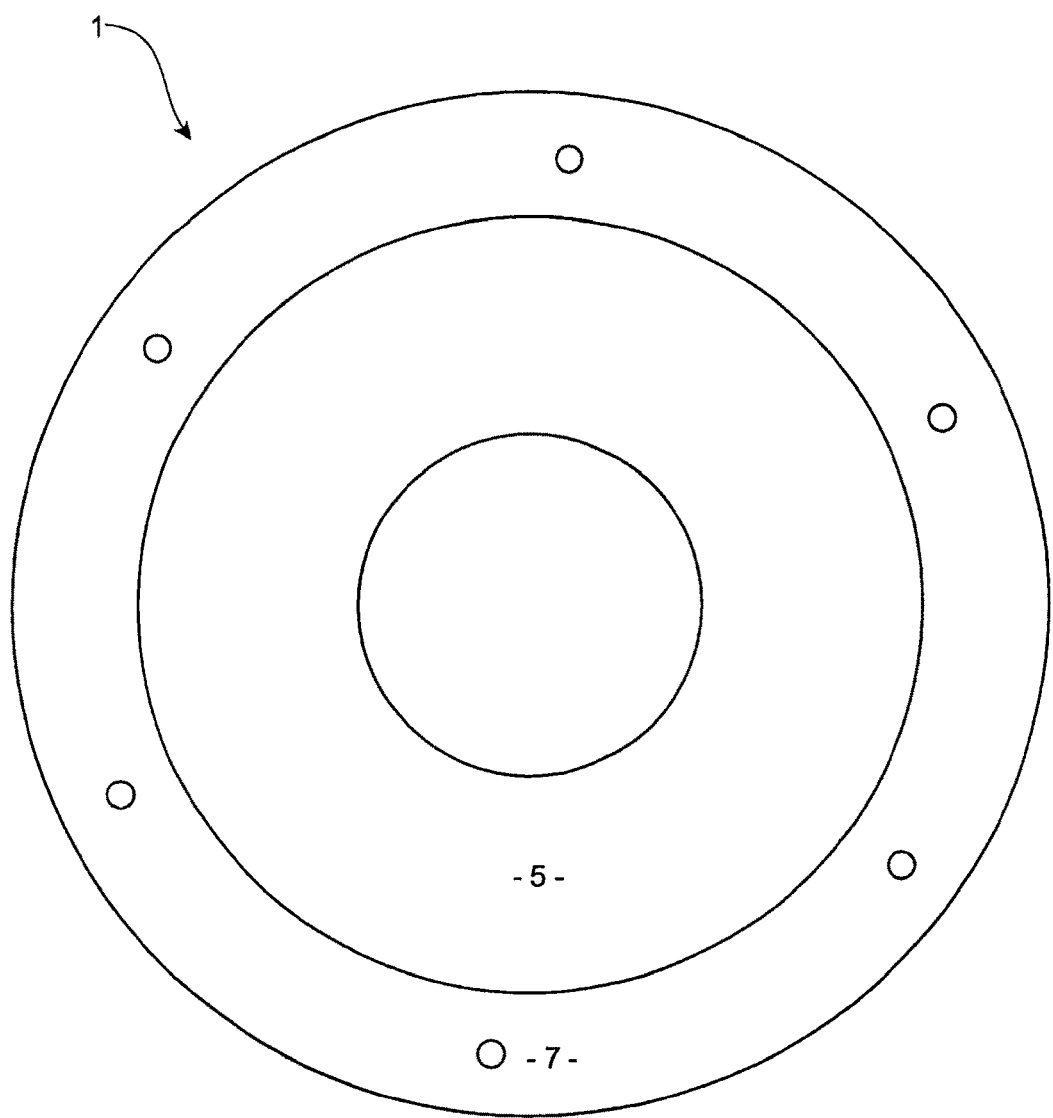
FIG. 1 shows in plan view a first embodiment of the sealing gland of the present invention, prepared for use.
Figure 2:
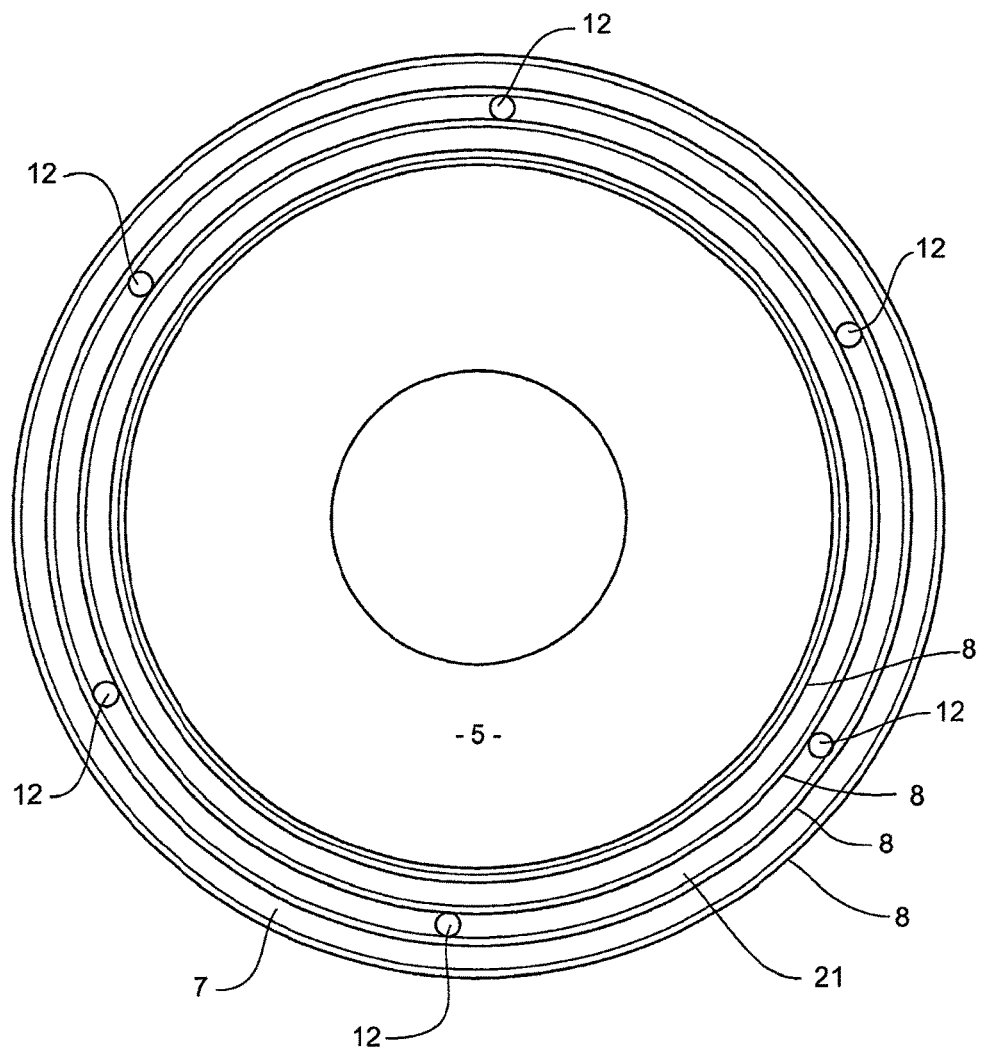
FIG. 2 shows a bottom elevation of the embodiment of FIG. 1.
Figure 3A:
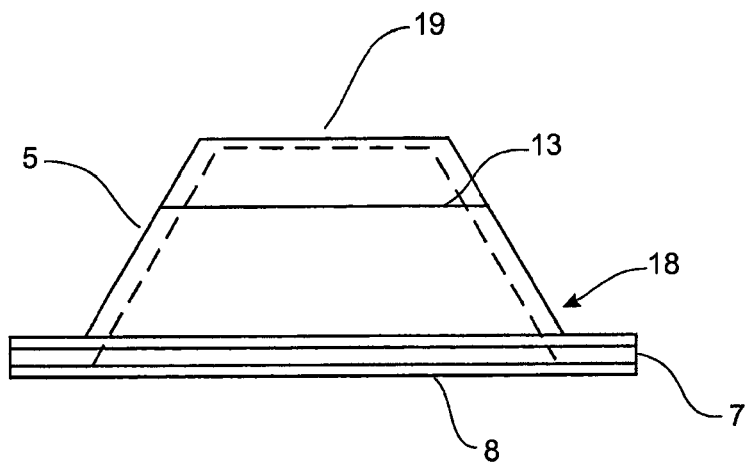
FIG. 3a shows a side elevation of the sealing gland of FIGS. 1 and 2.
Figure 3B:
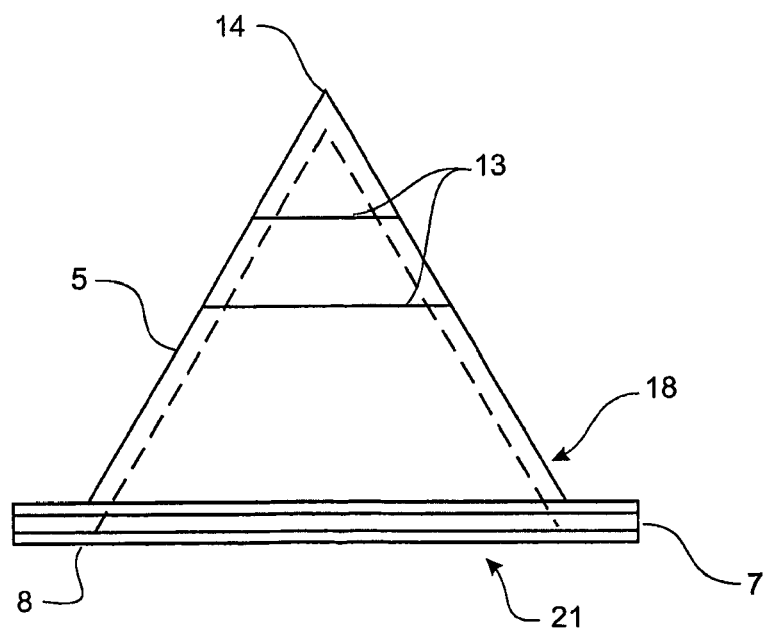
FIG. 3b shows the sealing gland of the first embodiment before it has been prepared for use, having a full cone on its upper portion.
Figure 4:
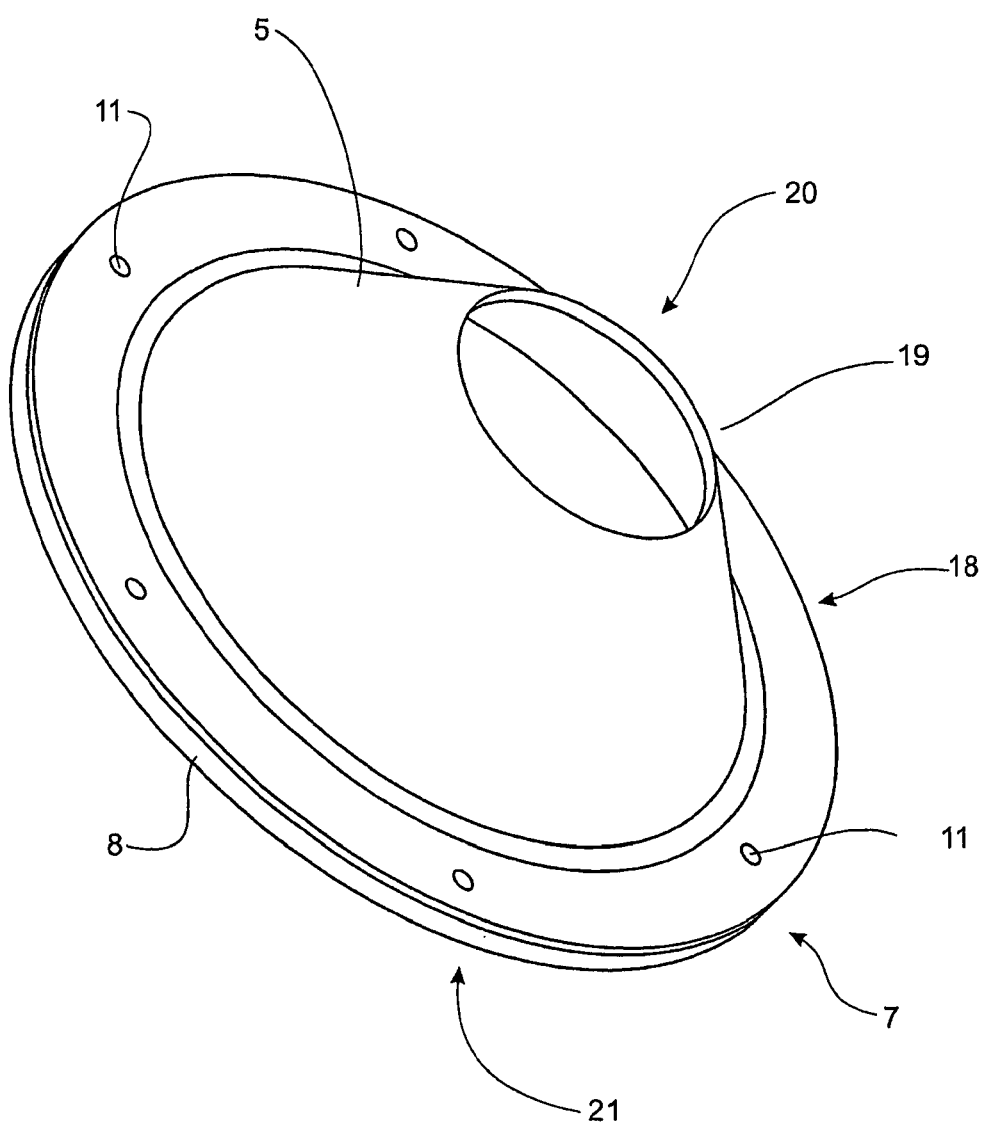
FIG. 4 shows the sealing gland of the first embodiment of the present invention in top perspective view.
Figure 5:
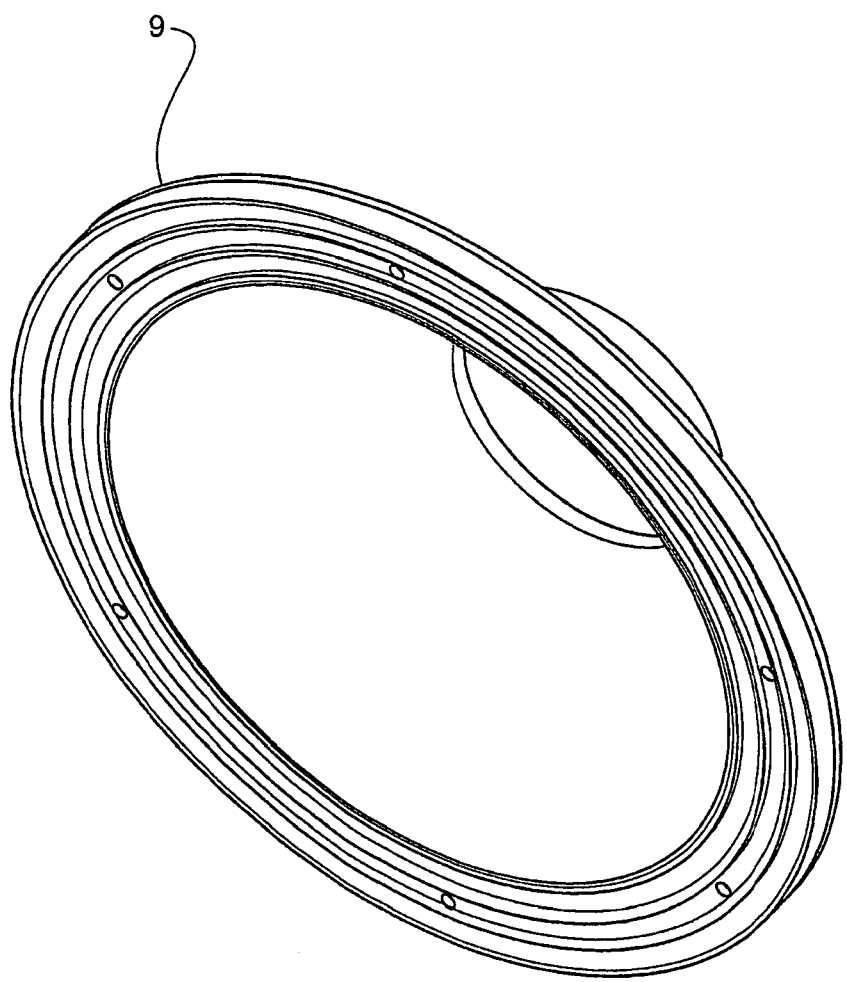
FIG. 5 shows the sealing gland of the first embodiment of the present invention in bottom perspective view.

A flange 7 extends outwards from the base or lower periphery of the upper part 5. The upper part 5 (or "skirt") may be a full cone having an apex 14, as shown in FIG. 3b, with the cone including markings 13 in rings at different heights around the cone, which indicate at which point a user should cut to create an aperture suitable for a particular size of elongate member 2. The marking 13 may additionally include indicia to indicate a particular diameter or size which may occur when cutting at that mark. It should be noted that although in the preferred embodiment these markings are perpendicular to the centre line, or centre of rotation of the upper part 5, these could be angled to create oval apertures for pipes of oval cross-section, or if an angled construction, with the elongate ember angled away from perpendicular with said surface, is required. It should also be noted that the skirt 5 may be pre-cut to a required size of a particular elongate member 2. The tapered skirt, truncated cone, pyramid or frustoconical skirt 5 thus created has an upper aperture 20 which defines an upper periphery for sealing against an elongate member.

As described above, the skirt 5 has at its upper portion 19 an opening 20 (which may be provided by the pre-cut sealing gland 1 or when cut from the cone configuration as per FIG. 3b). The opening 20 provides an upper seal 6 or a surface for an upper seal 6. The flange 7 will now be described in more detail with reference to the Figures.

Figure 7A:
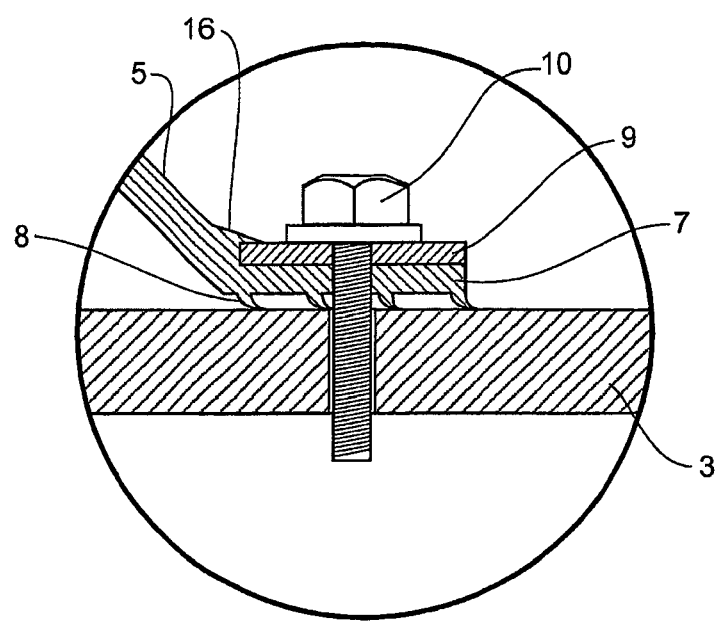
FIG. 7a shows the detail A of FIG. 6 with the lips deformed against the substantially flat surface.
Figure 7B:
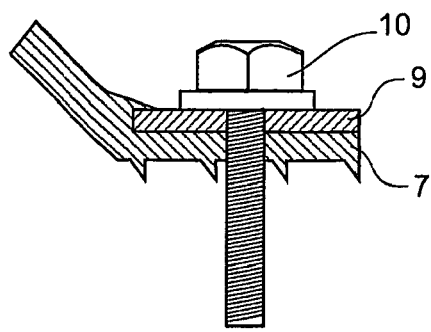
FIG. 7b shows the undeformed lips with fastener.

The flange 7 has a lower surface 21, the opposite side from the apex 14 of the cone 5. In the preferred embodiment, a number of endless lip seals 8 are located on this surface and they are able to form a labyrinth seal. The endless lip seals 8 are of sufficiently thin cross section so that with the application of a small amount of pressure from a surface or object they are able to deform and seal about or on that surface or object. This is best shown in FIG. 7a where the endless lip seals 8 have deformed against an object, in this case a substantially flat surface 3. By having a number of concentric endless lip seals 8 a number of sealing points on such a surface or object are formed to further ensure the integrity of such a seal formed.

The flange 7 also has a plurality of flange apertures 12 formed there through. In use, these receive fasteners 10. In the preferred embodiment these flange apertures 12 are each of a lesser diameter than the fasteners 10 which they are to receive. This is to further ensure the integrity of the seal formed, as the preferred material from which the flange 7 is manufactured is a deformable, elastic, and resilient material which is also chemically inert, such as silicone based compounds, or similar. The flange apertures 12 will therefore stretch to fit around the fasteners 10 and thereafter seal against them.

Present also towards the lower portion of the skirt 5 is a retention flange 16 this presents in one embodiment as an undercut to the skirt or cone 5, or an extension of the skirt 5 and presents approximately an aperture of similar thickness to a compression ring 9, as described below. The retention flange 16 is intended to retain the compression ring 9.

This is also a major point of difference between the present invention and the prior art. The prior art sealing glands that have such a metal outer ring present have this bonded to the flexible material of the gland. This bonding is achieved through a lengthy in mould process requiring substantial preparation of the metal outer ring, or requires post working, gluing and curing to attach the metal ring to the gland.

The compression ring 9 is a hollow ring which in use slips over the skirt or cone 5, and is located so that its lower surface rests against the upper surface of the flange 7, with the upper surface of the inner edge underneath the lower surface of the retention flange 16, so that the retention flange bears upon the upper surface of the compression ring 9. It can be seen that the inner edge or inner part of the compression ring 9 will be sandwiched between the retention flange 16 and the flange 7, with the two surfaces acting in co-operation to retain the compression ring 9 to the sealing gland 1. Any other form of retention of the ring is within the scope of the invention.

The compression ring 9 is made of a sufficiently resilient material such that when the sealing gland 1 is applied and fasteners are used, the compression created by the fasteners is able to be resisted by the stiffness of the compression ring so that an even or substantially even pressure is applied to the flange 7 by the compression ring 9. If a higher degree of seal is required then a stiffer compression ring 9 may be used so that more force may be exerted onto the flange 7 and therefore the endless lip seals 8.

This is a further major point of difference between the prior art sealing glands and the present invention. The metal ring, when present on other sealing glands, is not a resilient stiff ring but rather is flexible to allow conformation of the ring and gland to the surface below. Also prior art sealing glands rely on the addition of sealant after the gland is in place to affect a complete seal In the preferred embodiment, the compression ring 9 has a first plurality of apertures 11 spaced at intervals around its body, which allow fasteners to pass there through. The apertures 11 are in the preferred embodiment concentric and able to be co-located with the second plurality of apertures 12 in the flange 7.

In applying the sealing gland to an elongate member 2 and substantially flat surface 3 to be sealed the following steps are undertaken. The correct opening 20 diameter to form the upper seal 6 is selected and/or cut. The sealing gland is thereafter slid down or along the elongate member 2 (for example a pipe or similar conduit) until the endless lip seals 8 meet the substantially flat surface 3. The substantially flat surface 3 is only an example and any form of sealing surface may be appropriate and in some embodiments the compression ring 9 and/or flange 7 may be formed to conform to various surfaces that may not be flat, for example corrugated, curved or similar. There may additionally be some form of reinforcing internal of the flange 7 which allows confirmation of the flange 7 to the required surface. This reinforcing or conformable, yet shape retaining material, may be in exclusion or in addition to the compression ring 9. The upper seal 6 deforms and shapes itself around the elongate member 2 by the elastic tension of the skirt 5 to form a seal. The opening 20 is therefore generally cut to a slightly smaller diameter or size than that of the elongate member 2 to which it is to seal to.

In some uses the gland may be assembled to the elongate member separate to the compression ring 9. For example the compression ring 9 may be slide of the elongate member 2 before sliding the sealing gland 1 over. The compression ring 9 only being associated with the retention flange 16 after the gland is located against the substantially flat surface 3.

In the preferred embodiment, the elongate member 2 (and thus the corresponding opening 20) are round and created from a conical upper part 5. This is useful for example when the sealing gland 1 is used with pipes or similar. However, if a pyramidal upper part 5 is used, the shape of the aperture 20 created may also be rectangular, triangular, a regular or irregular polygon or any other shape that is necessary to be sealed to. Correspondingly the pending skirt 5 and flange 7 may be of a corresponding shape to that of the opening or may form a transition from the shape of the opening to for example a substantially circular flange 7.

Once the sealing gland 1 is in place on the elongate member 2 and the surface 3, fasteners 10 are passed through the apertures 11, 12 on the compression ring 9 and the flange 7 respectively. These fasteners then pass through and engage either into corresponding nuts or corresponding fastening means in the surface 3 or through the surface 3. Thereafter the fasteners 10 are tightened such that the end-less lip seals 8 deform against the surface 3 to form a seal. Additionally if higher compression pressures are required to form the seal further plurality of apertures may be added to both the compression ring 9 and flange 7 so that further force can be exerted without deformation or substantial deformation of the compression ring 9 by use of further fasteners 10.

Figure 6:
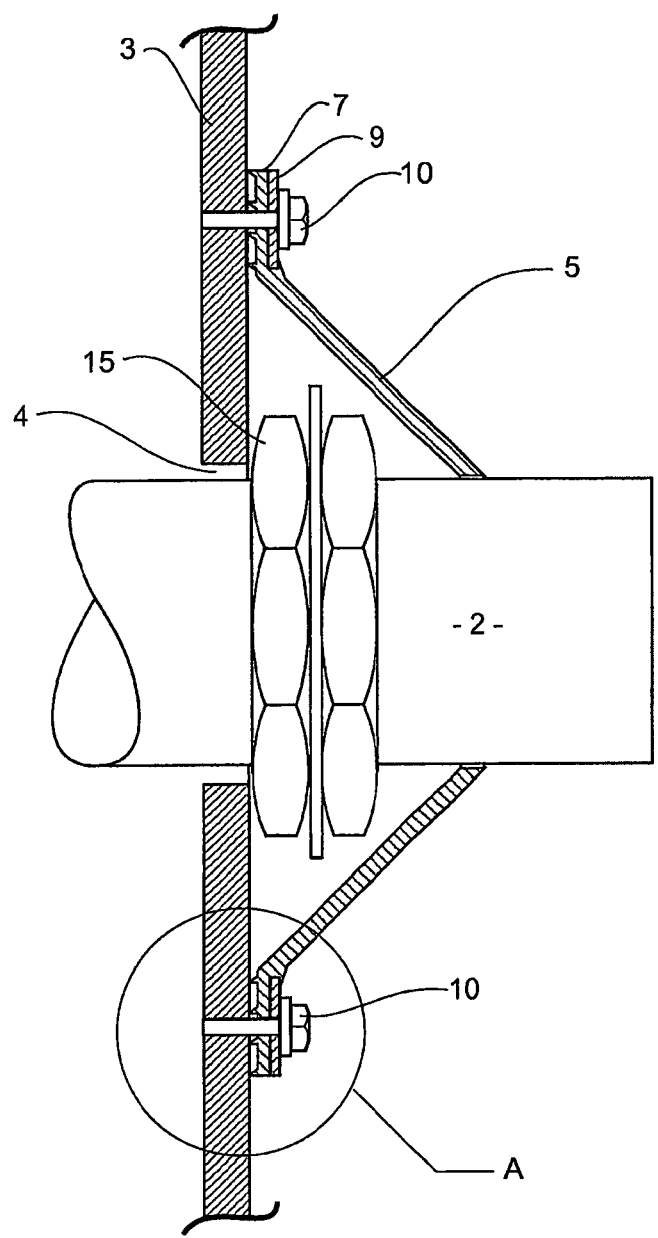
FIG. 6 shows a cross-sectional view of the first embodiment of the sealing gland of the present application in use, sealing to a pipe and also bearing on a substantially flat surface by means of a compression ring, with the sealing gland located over a union nut of two pipes.

The material selected for forming at least the upper portion 19 of the skirt 5 is sufficiently resilient to pass over or be able to be deformed over most unions or joins 15 which may be present in the elongate member 2. For example such union or joins 15 may be affected by welding in which case minimal deformation is required to pass over the weld, but conversely the join may be affected by a set of union nuts as shown in FIG. 6 and rather than disassembling the whole elongate member 2 structure the sealing gland 1 can by stretched over the past for its final resting point.

The advantage conveyed by this invention is that a seal can be affected simply, quickly, and repetitively over an elongate member 2 and joins thereof and surface which the elongate member may penetrate. The seal is affected with no sealant required and relies upon the elastic properties of the materials used to form this sealing gland 1. The same materials that are used to form the upper portion 19 of the sealing gland 1 may also be used to form the endless lip seals 8.

In the preferred embodiment the endless lip seals 8, flange 7, and skirt 5 are of unitary, or one piece construction. Such unitary construction is preferably made by moulding or similar in the resilient material, for example silicone as mentioned. The sealing gland 1 therefore in the preferred embodiment is a two piece construction being the silicone moulded component and metallic component of the compression ring 9. As stated the compression ring 9 is preferably manufactured from a stainless steel and in con-junction with the inert nature of the silicone provides a chemically resistant seal about the elongate member 2 on the surface 3.

The above-described embodiment is useful for creating a seal between a surface and an elongate member. In some situations it may be desirable to create a seal between two elongate members of different diameters. The second embodiment gland is particularly intended for sealing of a first pipe 105 to a second pipe 106, that the first pipe 105 runs through, for example the second pipe 106 may be a kick pipe in a floor (or a wall) and provides protection of the first pipe 105 from knocking or damage, and provides also an aperture for the first pipe 105 to communicate through the floor or wall.

Figure 8:
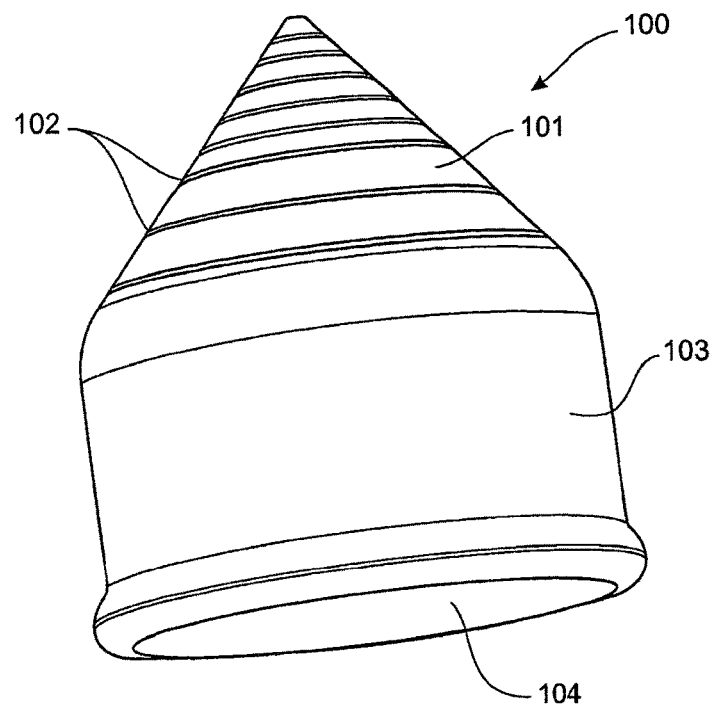
FIG. 8 shows a perspective view of a sealing gland according to a second embodiment of the present invention.
Figure 9:
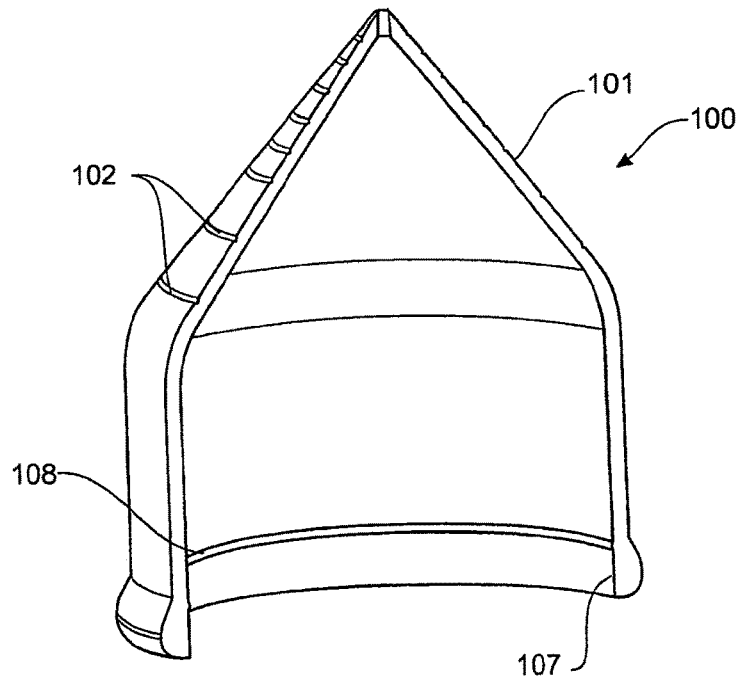
FIG. 9 shows a cutaway view of the sealing gland of FIG. 8, in perspective view.
Figure 10:
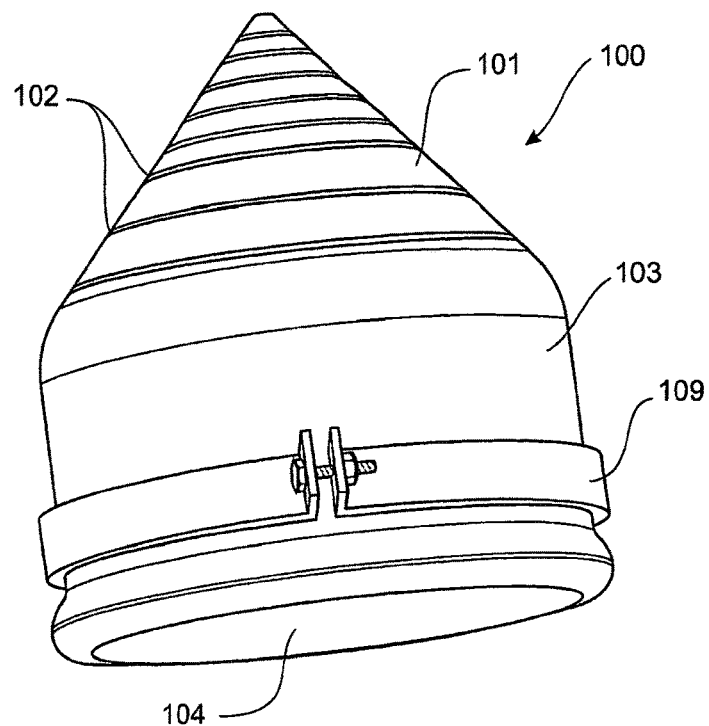
FIG. 10 shows similar view to that of FIG. 8 with the addition of tension band improve sealing a bottle second pipe.
Figure 11:
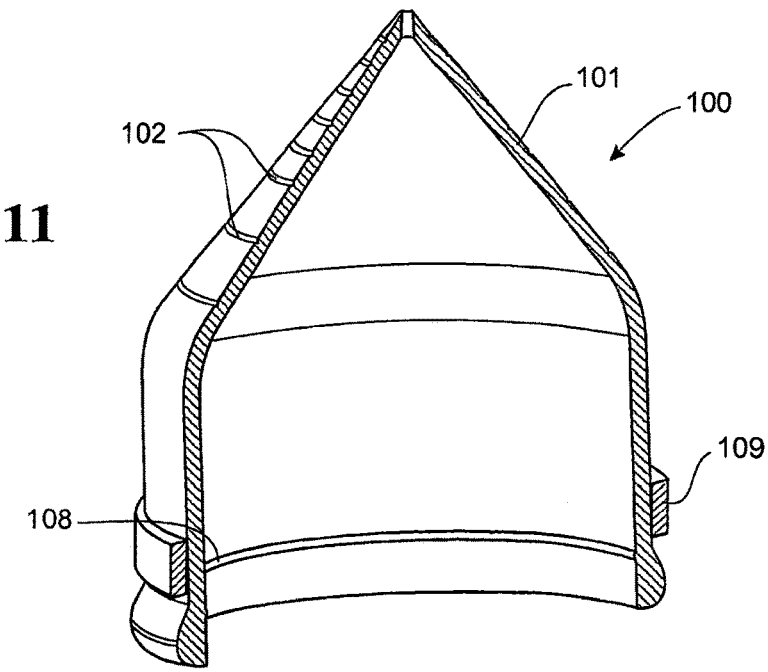
FIG. 11 shows a similar view to that of FIG. 9 with the addition of the tension band of FIG. 10.
Figure 12:
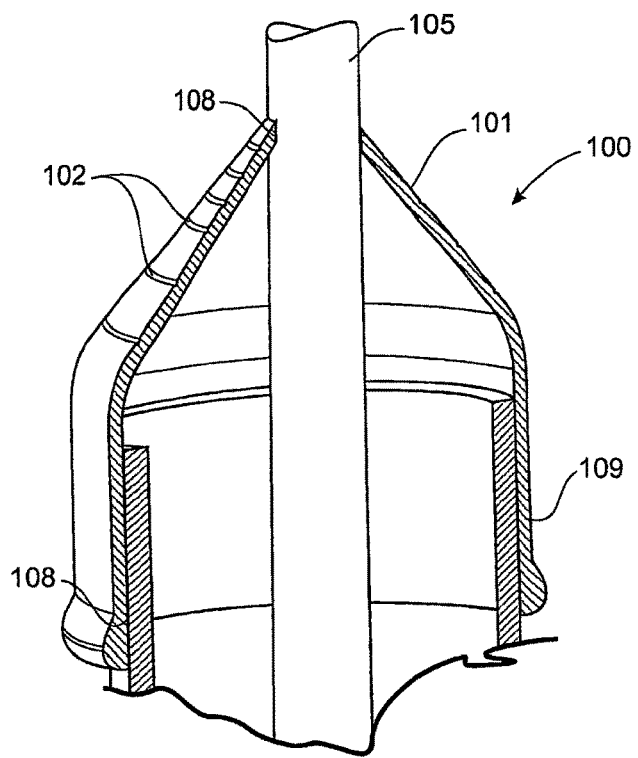
FIG. 12 shows the sealing of the gland of the second embodiment to the second pipes.
Figure 13:
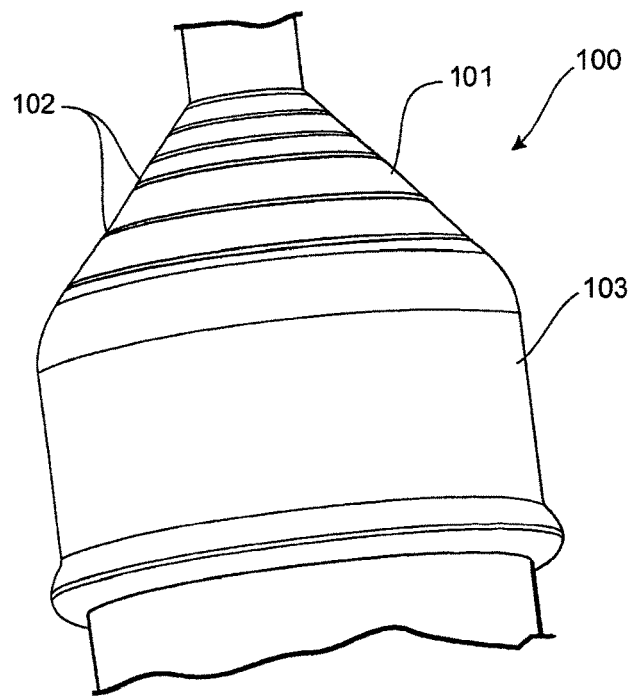
FIG. 13 shows a similar view to FIGS. 9 and 11 with the addition of the two elongate members of different diameter shown.
Figure 14:
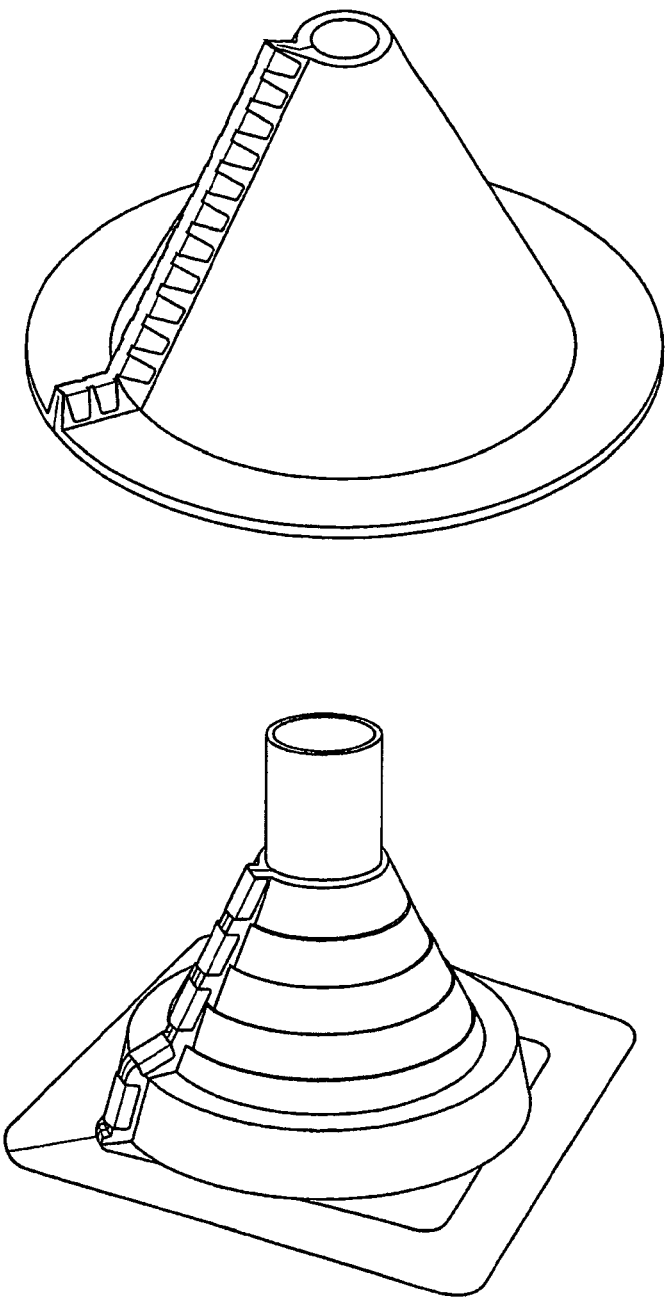
FIG. 14 shows two re-sealable sealing glands of the prior art showing the discrete pressure application to the re-sealable portion in perspective view.

A second, alternative embodiment of the invention that can be used to create this type of seal, shall now be described with reference to FIGS. 8 and 13. A sealing gland 100 is shown, in a similar fashion to the sealing gland of the first embodiment described above, this has a tapered skirt or conical upper part 101. Again, it should be noted that this upper part could be pyramid-shaped, with multiple sides from 3 upwards, to encompass elongate members which do not have circular cross-sections. Alternatively it may be circular in cross section but have a non-circular aperture formed therein.

As in the embodiment described above, the upper part 101 is marked at intervals along its height or length with cut marks 102. As described above, these can also be marked to show the suitable point at which a user should cut so that the sealing gland 100 can be used with a first pipe or elongate member 105 of certain diameter.

The lower section 103 of the sealing gland 100 extends from the base of the upper part 101. In the preferred embodiment, the lower section 103 is a hollow cylindrical shape, with an open lower end 104. However in other embodiments this tubular section may be a square tube or other multisided poly in cross section, whether regular or not. As in the preferred embodiment described above, the sealing gland 100 is made from a silicone material, or similar.

In use, the upper part 101 is cut to create an upper aperture, in a similar fashion to that already described for the first embodiment. A first pipe 105, or first elongate member can be passed into the sealing gland, with the perimeter of the upper aperture deforming around the outer surface of the first pipe 105 to form a seal.

A second pipe 106 or elongate member is introduced into the lower aperture or open lower end 104, with at least the end of the lower part deforming around the outer surface of the first elongate member to form a seal. It can of course be seen that the second elongate member 106 is of greater diameter than the first elongate member 105.

If required, the inner surface 107 of the lower portion 103 can be fitted with one or more endless lip seals 108 running in an unbroken loop around the inner surface of the lower portion 103. These aid in sealing between the inner surface of the lower portion 103 and the outer surface of the second elongate member. These may also be present in the upper part 101 to seal to the first pipe 105. The diameters of the portions where the elongate member pass though are slightly smaller than the actual diameters of the elongate members that are two pass there through. This is so that the natural elasticity of the material of the gland can stretch and form a seal onto the elongate member. In one preferred embodiment a tensile band 109 is used at least on the outer surface of the lower section to constrict the lower section at the second pipe 106. This helps improve the seal. The lower portion of the lower end 104 has a thickened band 111. This thickened band serves two purposes. Firstly it reinforces the lower portion 104 and stops tearing, particularly so when tools may be used to apply the sealing gland. Secondly the thickened band 111 serves as a reference to locate the tensile band 109 and prevent it working or falling off. Here may be a similar extension of the upper part as a sleeve which can have a similar tensile band if need be included. Such bands are known in the art.

It should be noted that where references to an orientation have been made above (e.g. upper, lower, base, horizontal etc.), these references are relative, and are made for the sake of convenience only. They refer to the gland oriented with the cone or skirt 5 facing upwards, and the sealing flange located at the lowest part or base of the sealing gland. The device of the invention can of course be utilised in any orientation desirable to a user.

A third embodiment of the present invention will now be described with reference to FIGS. 14 through 20a-b. The prior art re-sealable sealing glands shown in FIG. 14 have a discontinuous pressure applied across the re-sealable opening thereof. This results in an incomplete seal along the length of the opening and thus the seal will allow migration or entrance of water and particulate materials. This is undesirable and is what the present invention strives to overcome. Furthermore the present invention is made from a silicone base material as a requirement for conformability and to meet certain specifications whether for food handling or otherwise. The nature of a silicone based material is that it tears very easily. The use of a discontinuous crimping member of the prior art that has sharp edges will result in a tear and therefore failure of the sealing gland when made in silicone. This is particularly the case when the silicone material is under tension as is likely to occur with a re-sealable gland.

In this section where similar integers are used two integers previously described in this specification then they are taken to be the same integers.

The sealing gland 1 in a similar fashion to the first embodiment sealing gland has an upper seal 6 at or towards its upper portion 19. Though not desirable yet possible the upper seal 6 may be formed by removal of a cone portion as earlier described. Additionally there again are marks 13 to indicate where the skirt 5 can be cut to suit elongate members of varying sizes.

The body of the sealing gland 1 consists of an at least in part substantially frustoconical skirt 5. From the lower portion 18 of the skirt depends a flange 7. The sealing gland 1 has a re-sealable spilt or elongate opening 30. The re-sealable split runs from the upper portion 19 or upper seal 6 to the external edge or surface 35 of the flange 7. This allows the sealing gland 1 to be opened and applied around and in situ elongate member 2, for example a pipe and thereafter sealed down as described below to form a seal between the elongate member 2 and substantially flat surface 3.

Figure 15:
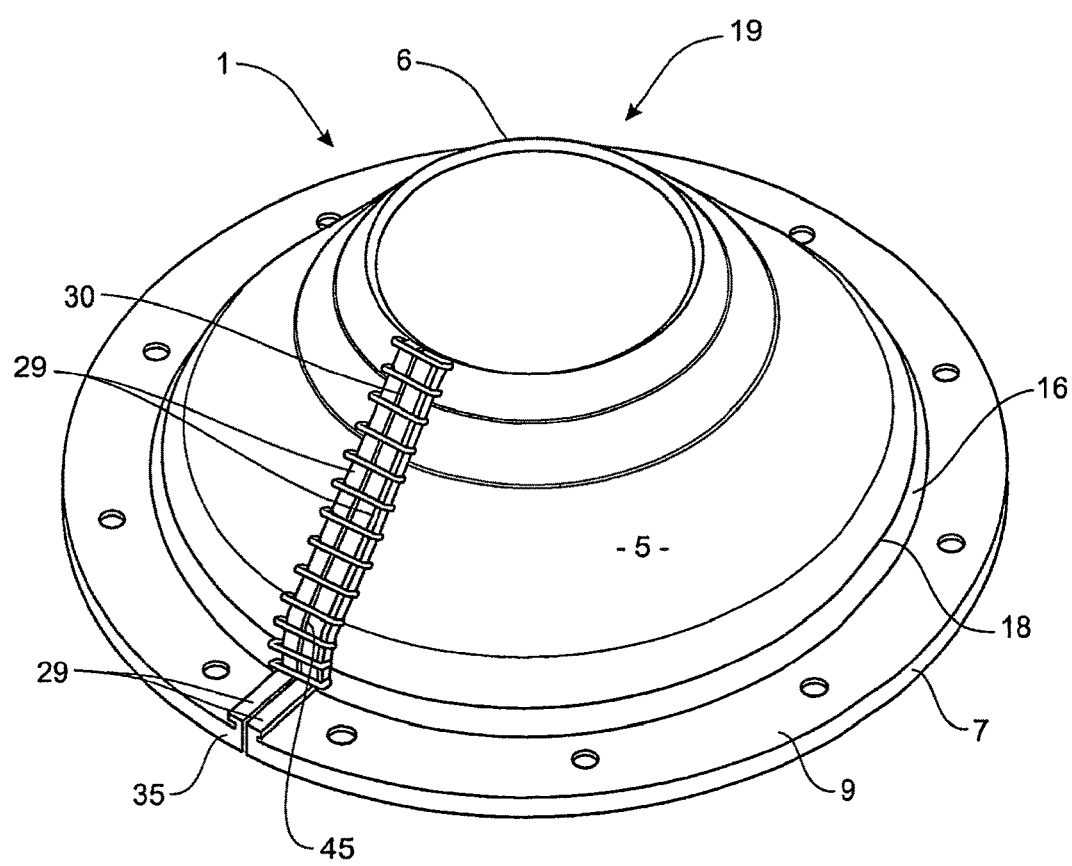
FIG. 15 shows a perspective view of a further embodiment of the present invention showing a re-sealable opening of the peripheral sealing gland including the compression ring and compression clamp.
Figure 16:
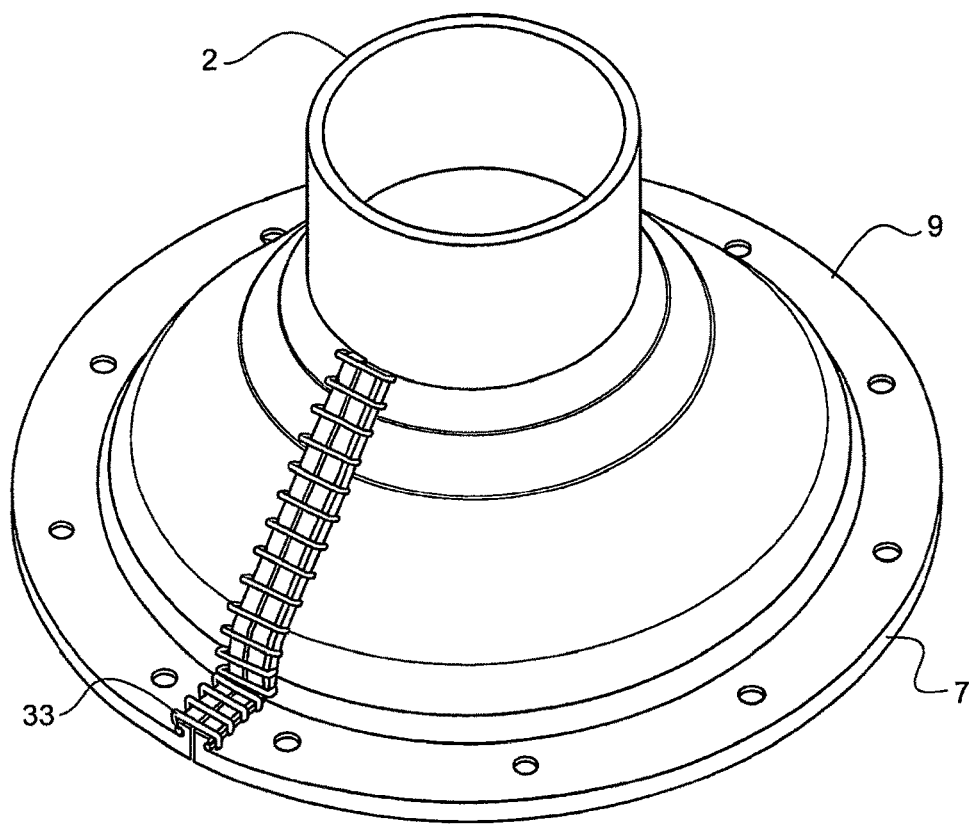
FIG. 16 shows a re-sealable peripheral compression gland of the further embodiment in isometric view sealed about an elongate member and against a substantially flat surface.
Figure 17A:
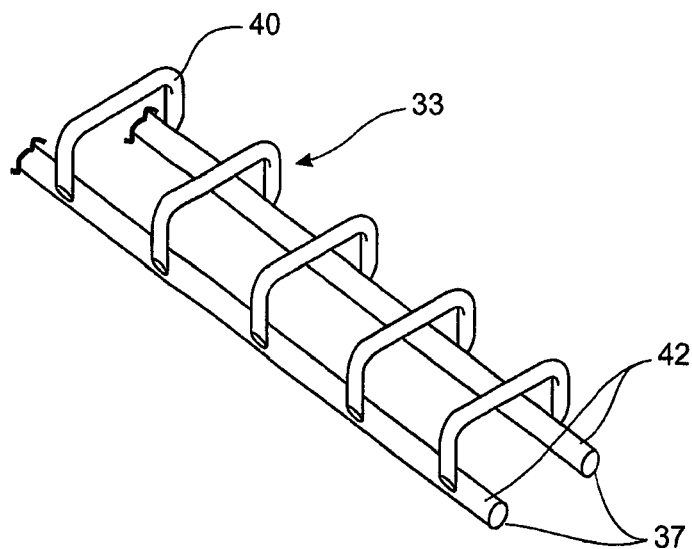
FIG. 17a shows a perspective compression clamp for the re-sealable peripheral sealing gland.
Figure 17B:
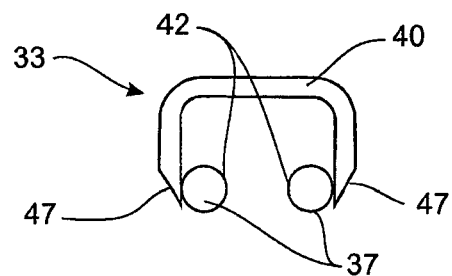
FIG. 17b shows in end view a preferred form of compression clamp.
Figure 18:
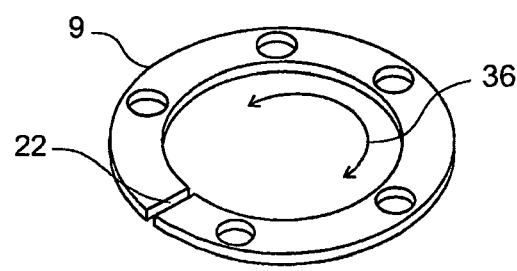
FIG. 18 shows a compression ring for this further embodiment with a break to allow passage there through of the re-sealable opening.
Figure 19A:
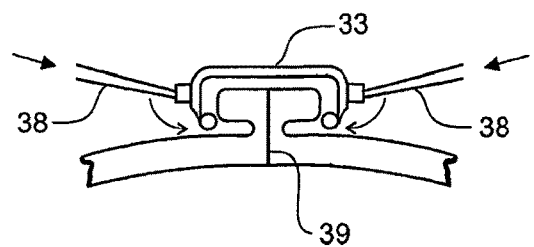
FIG. 19a shows a cross section perpendicular to the re-sealable opening showing a compression clamp of one form prior to deformation and application of sealing pressure.
Figure 19B:
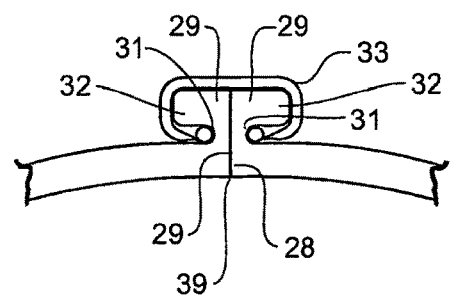
FIG. 19b shows the same view as A with the exception that the compression clamp has been deformed to apply sealing pressure to the re-sealable opening.
Figure 19C:
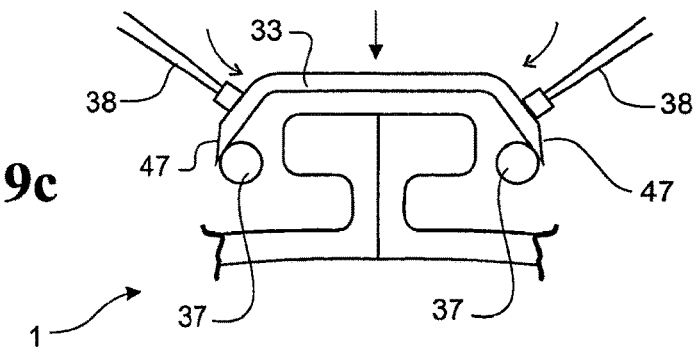
FIG. 19c shows a further embodiment of the compression clamp being clipped in place over the continuous upstands prior to inward deformation.
Figure 19D:
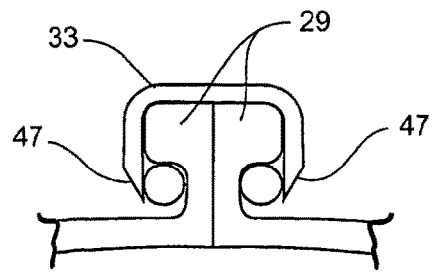
FIG. 19d shows this second embodiment compression clamp deformed and applying continuous pressure to said re-sealable split.

Along each side or edge of the re-sealable split 30 there are continuous upstands 29. The continuous upstands run the entire length of the re-sealable split or elongate opening 30. The inner upstand surfaces 28 mate upon sealing of the re-sealable split 30 to form a complimentary sealing surface 39 (also referred to as apposing seal faces). The complimentary sealing surface 39 may be a straight line or planar in cross section but alternatively may be labyrinthine as required. The re-sealable split or elongate opening 30 also may be a straight line as depicted in FIGS. 15 and 16 but alternatively may follow a curve, line, a seal line 45 or any other shape as required, and is not necessarily a near radial line as depicted.

On the external surfaces 32 of the continuous upstands 29 there is each an undercut 31. This undercut may either be pre-formed in the external surface 32 or may be formed by the compression clamp or crimpable clamp 33, and compression ring 9 as described below.

The flange 7 also has a portion of a re-sealable split 30. This is held into place by the compression ring 9 having a split 22. Upon application of the sealing the compression ring 9 is opened in a spiral form to pass over the elongate member 2. The compression ring 9 is then located to under engage the retention flange 16 and the edges of the split 22 locate into undercuts 31 (either pre-formed or formed by the compression ring) in the continuous up stands 29. The resilience of the compression ring 9 in the hoop direction 36 is preferably sufficient to form the seal at the upstands 29 in the flange 7. Alternatively fasteners either side of the upstands 29 and the flange 7 will provide sufficient force to create the seal in this portion. If additional sealing force is required then a compression clamp 33 (to be described) can be added to this portion. This can be seen in FIG. 16.

Along the remainder of the re-sealable split 30 a compression clamp or crimpable clamp 33 is located. This can either be slid along the length of the re-sealable split 30 and may impart sealing pressure as it is applied. Alternatively it may be passed over the sealable split 29 in a clipping fashion. If requited the compression clamp 33 can thereafter be deformed inwards by a deformation tool 38 to provide sufficient or additional sealing pressure. Such additional pressure may be applied at the time of installation or at a later date if for any reason the seal proves to not seal 100%.

The compression clamp 33 consists of two substantially parallel rails 37 that have on them pressure application surfaces 42. The pressure application surfaces 42 are the inner surfaces of the parallel rails 37 which will engage with the external surface of each of the undercuts 31. Each of the parallel rails 37 has connection portions 40 running from one parallel rail 37 to the other parallel rail 37. In the preferred embodiment these connection portions 40 follow the general external contour of the two continuous upstands. Therefore they are arched so that they run out, above and over the continuous up stands 29 of the sealing gland 1 and re-sealable split 30. In other embodiments the connection portions 40 may be arched or follow other contours. The clamp in the preferred embodiments has the connection portions 40 welded to the parallel rails 37.

The lower external portion 47 of the connection portion 40 is cut away so that no sharp surface is presented to the material of the gland. This can be clearly seen in FIG. 19c. In this way the gland is prevented from tearing and also the clamp can slide smoothly into place.

Although this is the preferred method of attachment other methods known in the art such as press metal forming, forging can also manufacture the compression clamp and are considered to be within the scope of the invention. In use the sealing gland 1 is applied around an elongate member 2 and located against a substantially flat surface 3. The compression rings 9 with its split 22 is then located about the elongate member 2 and down onto the flange 7. The compression clamp 33 is then located about the remainder re-sealable split 30 to seal either by its static form or seal by the addition of deformation inwards to seal the re-sealable split 30. The compression ring 9 and compression clamp 33 together provide continuous contact along the length of the re-sealable split 30, either side of the complimentary sealing surface. Due to the tearable nature of the material forming the sealing gland 1 the sealing gland 1 is prevented from tearing particularly as it would otherwise do so when a clamp of discrete nature of the prior art is used.

The open nature of the connection portions 40 allow the compression clamp to bend either before installation or in use to follow any contour the continuous upstands 29 and re-sealable split need to take. For example the compression clamp can easily be conformed lines radial of the elongate member 2, even if the radial line is curved in side view.

If desired the compression clamp 33 and ring 9 can be removed to allow removal and reapplication of the sealing gland 1. The compression clamp 33 can either be slid off, or the connection members 40 can be cut and a new compression clamp 33 applied upon resealing.

Figure 20A:
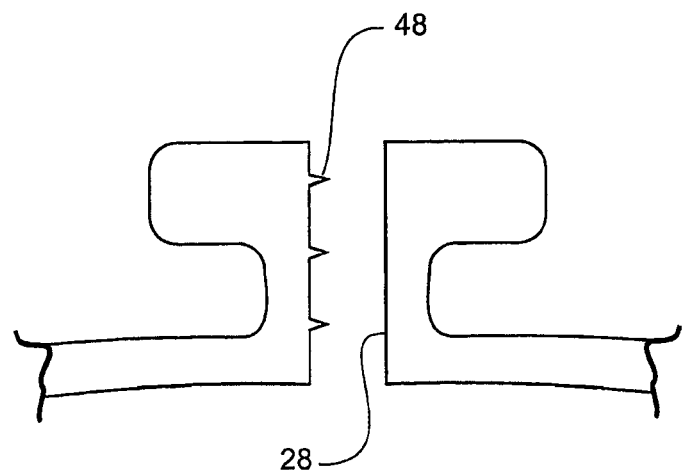
FIGS. 20a and 20b show in cross section of the seal portion two possible variations of a labyrinth seal, FIG. 20a showing a seal surface with lips similar to those on the bottom of the flange, and FIG. 20b a labyrinth comprised of ribs that engage along the length of the seal.

Shown in FIG. 20 are two possible forms of labyrinth seal. A seal lip 48 form is shown in FIG. 20a. This is essentially a seal lip 48 similar in cross section to the lip seal 8 on the underside of the flange 7. This form of labyrinth seal relies upon deformation of at least one seat lip 48 against and into the opposing complimentary mating surface 39. In the preferred form there are number of lip seals 48 present on one, other or both opposing complimentary mating surfaces 39.

Figure 20B:
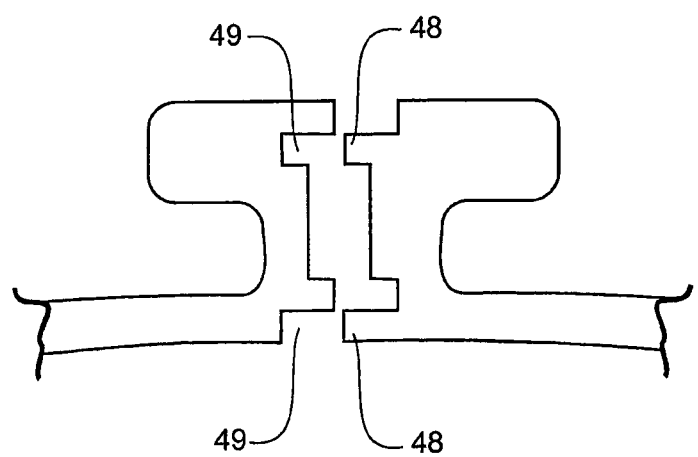
Figure 21:
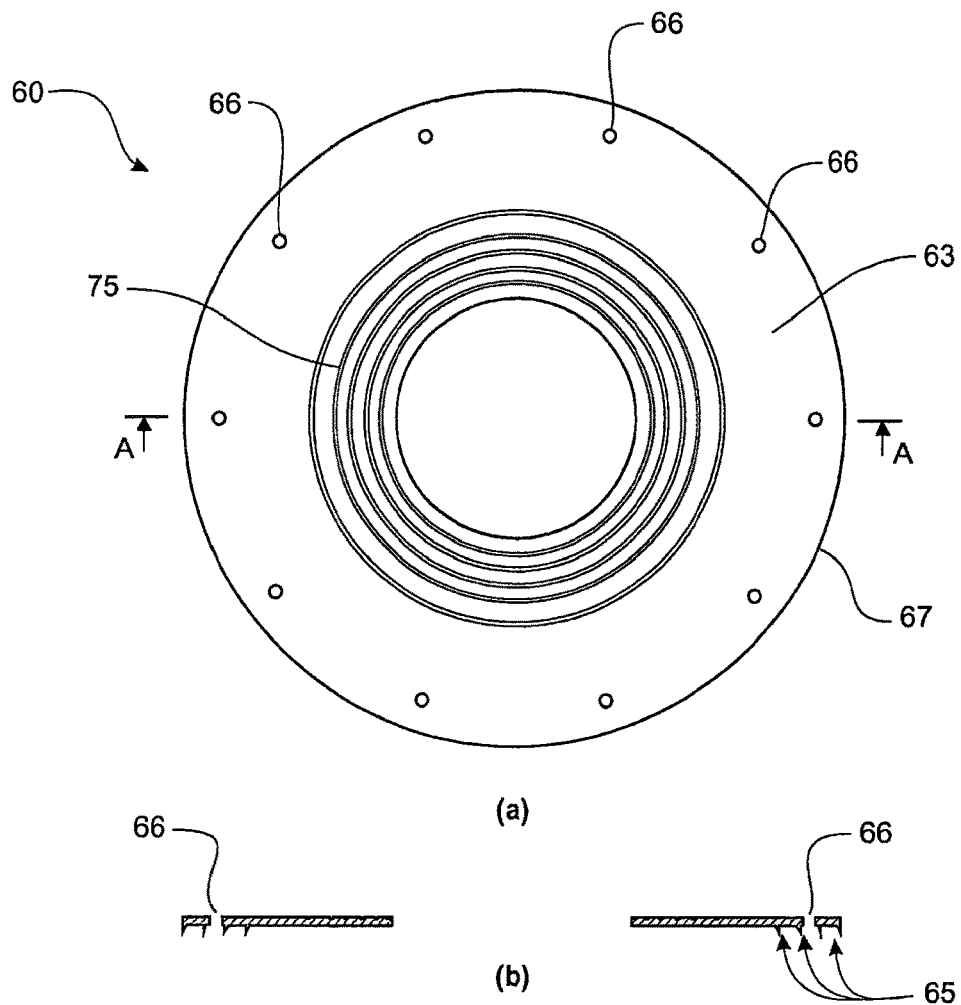
Figure 22:
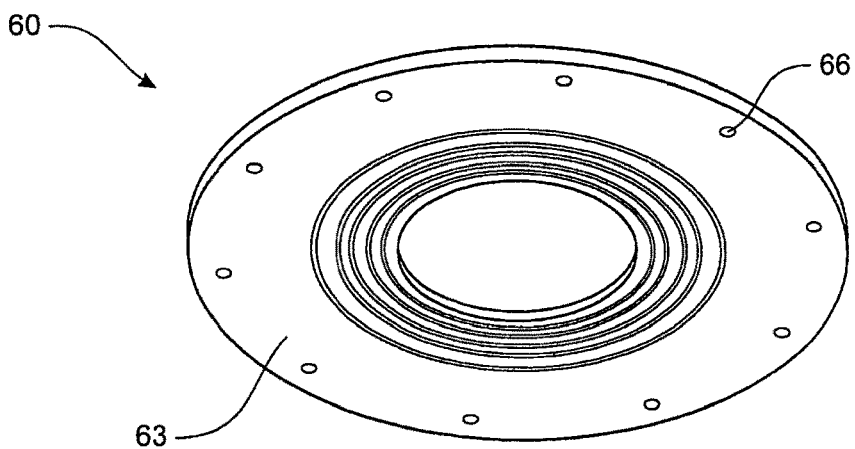
FIG. 22 shows the embodiment of FIG. 21 in plan isometric.
Figure 23:
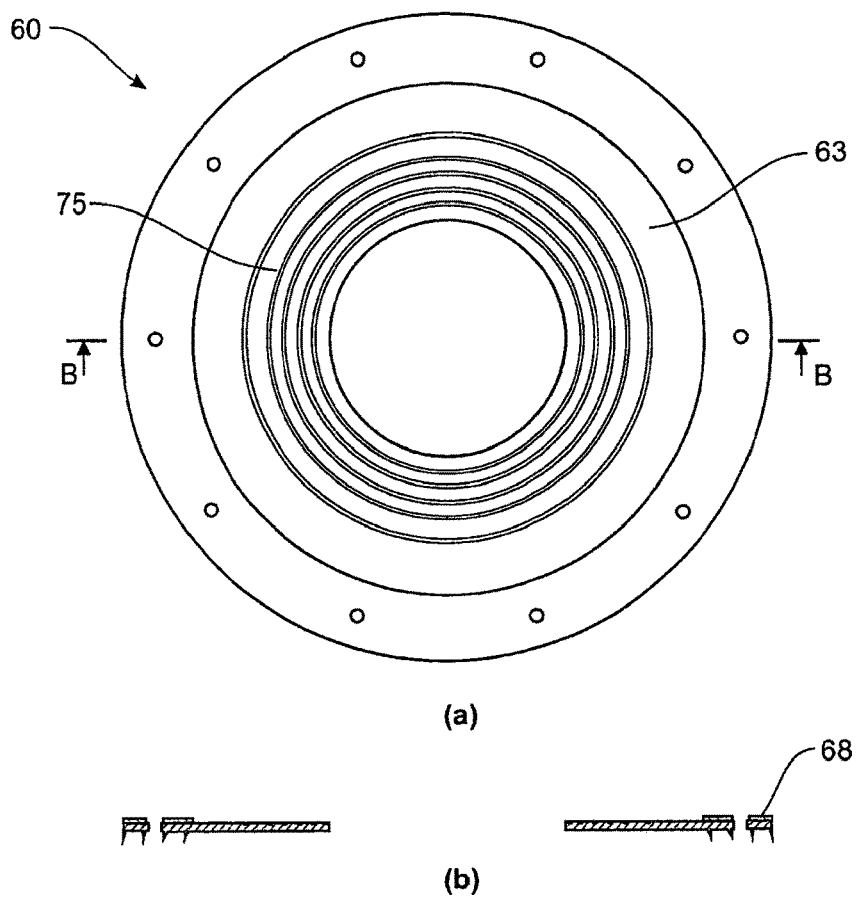
FIG. 23 shows a similar view to that of FIG. 21 in that a compression ring has been added in plan view a) and a sectional view and b) a sectional view along the line of B-B.
Figure 24:
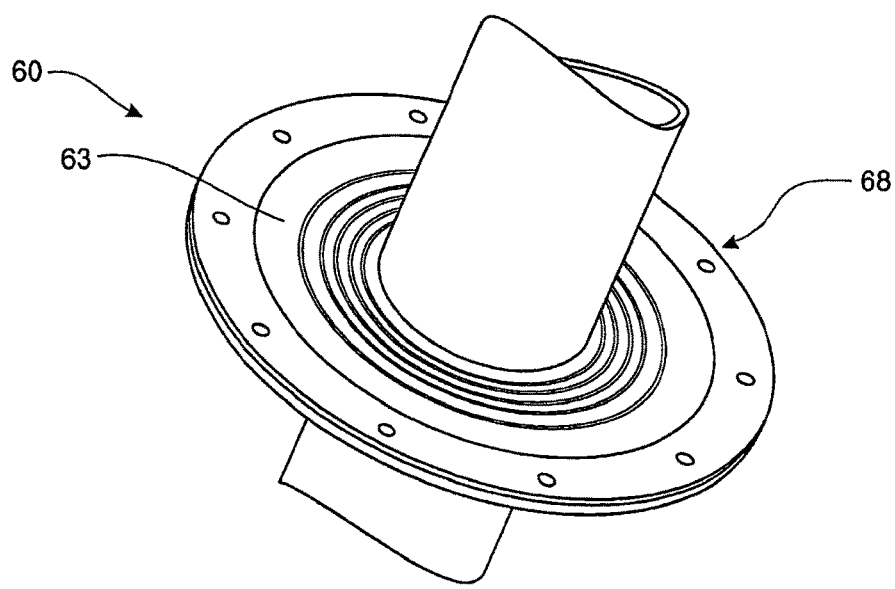
FIG. 24 shows a similar view to that of FIG. 22 in that a plan isometric view is shown with the addition of the compression ring, the sealing gland shown sealing a pipe or similar elongate member.
Figure 25:
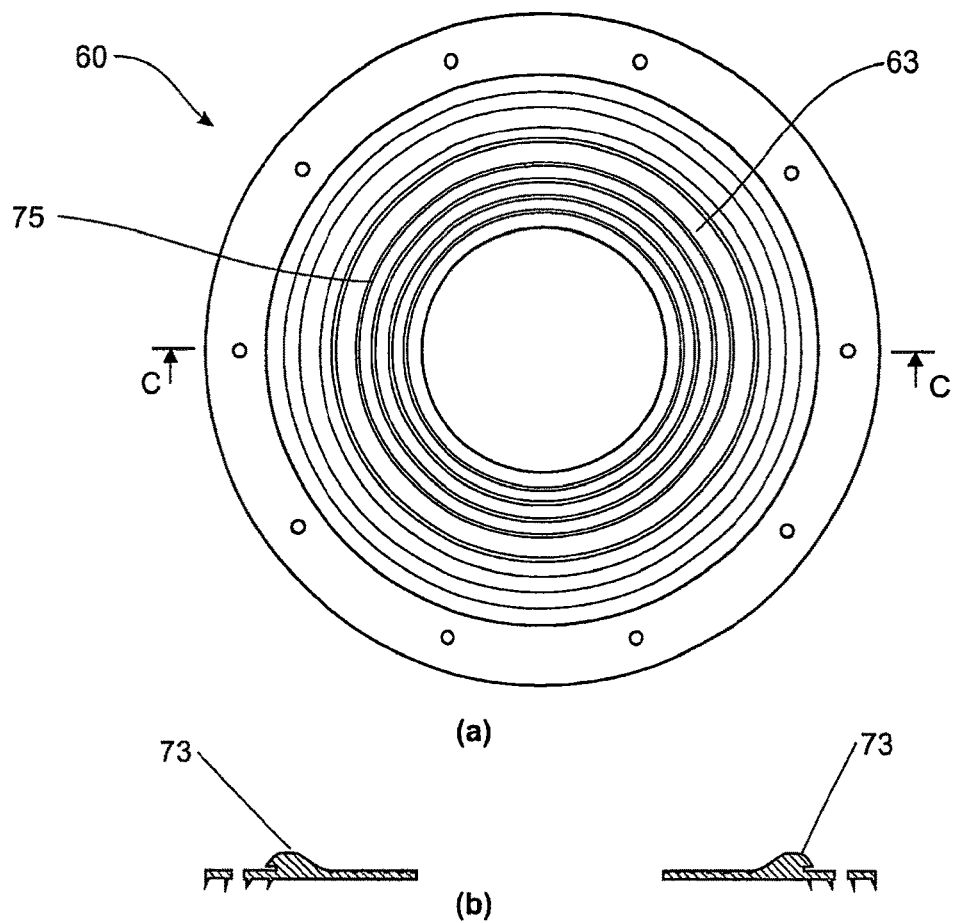
FIG. 25 shows us a similar view to that of FIGS. 21 and 23 with the addition of a retaining lip for the compression ring shown in plan view a) and also b) a cross-sectional view along line C-C.
Figure 26:
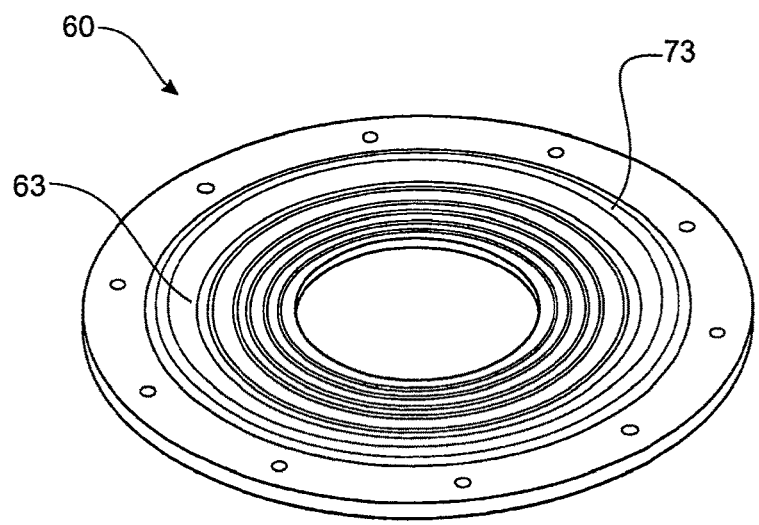
FIG. 26 shows a similar view to that of FIGS. 22 and 24.
Figure 27:
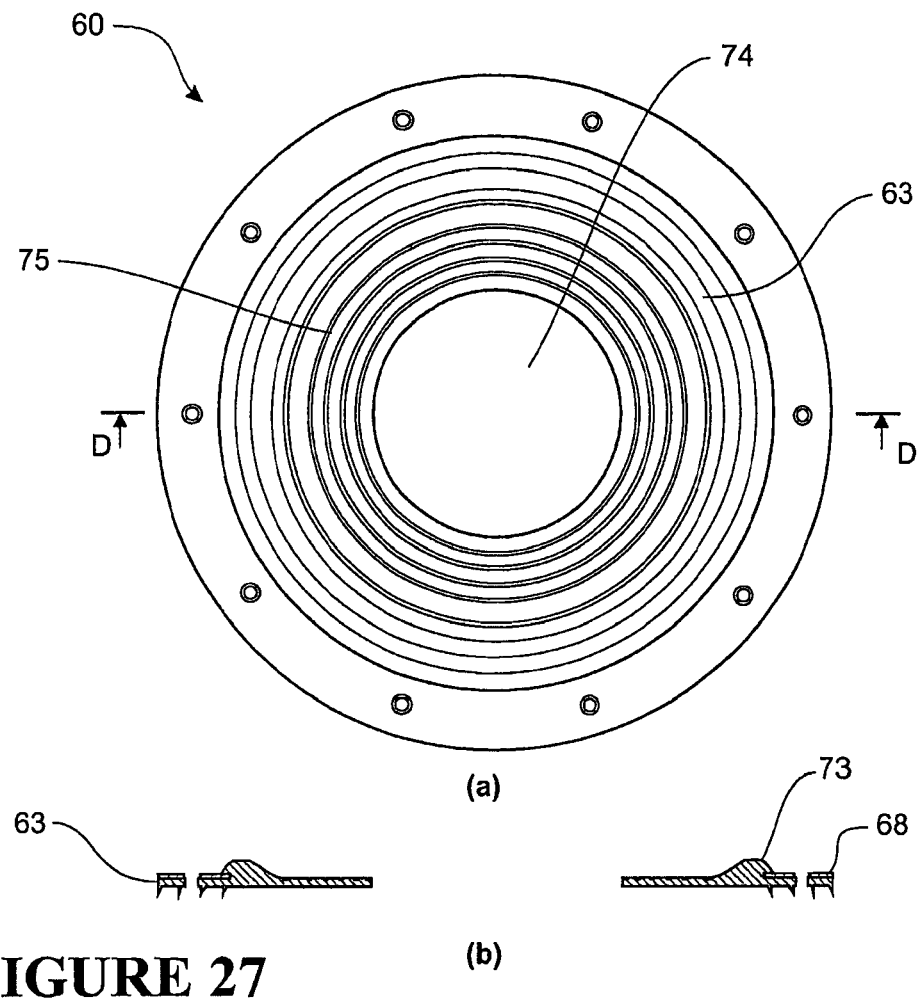
FIG. 27 shows a similar view to that of FIG. 25 with the addition of a compression ring being retained by the retaining lip in a) plan view and b) a section view along the line D-D.
Figure 28:
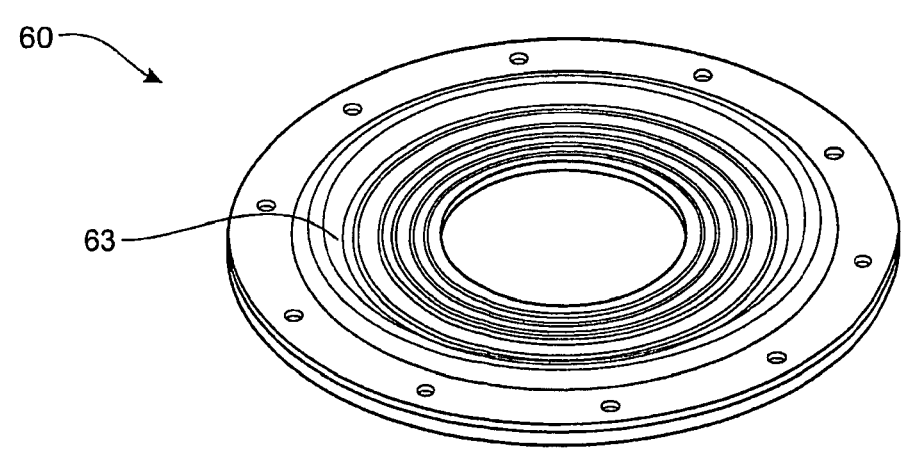
FIG. 28 shows a similar view to that of FIG. 26 with the addition of the compression ring.
Figure 29:
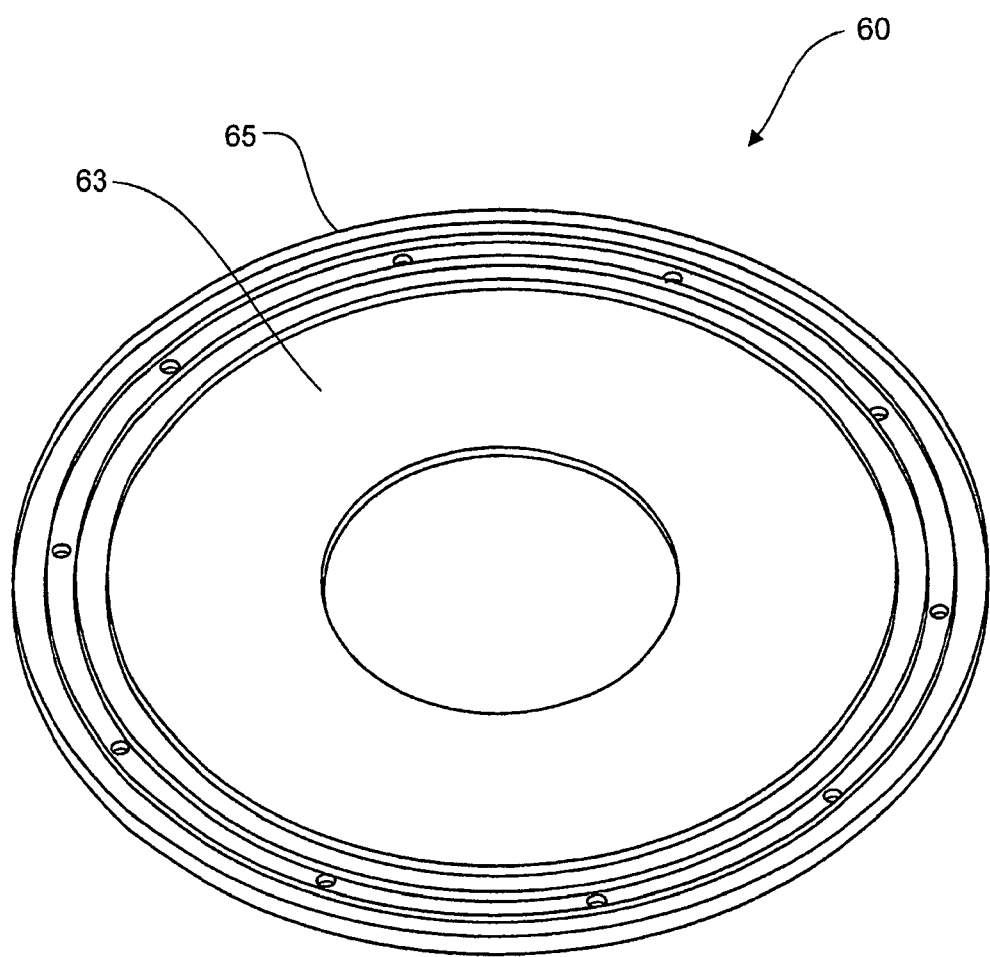
FIG. 29 shows a bottom isometric view of the embodiment shown in FIGS. 21 through 28.
Figure 30:
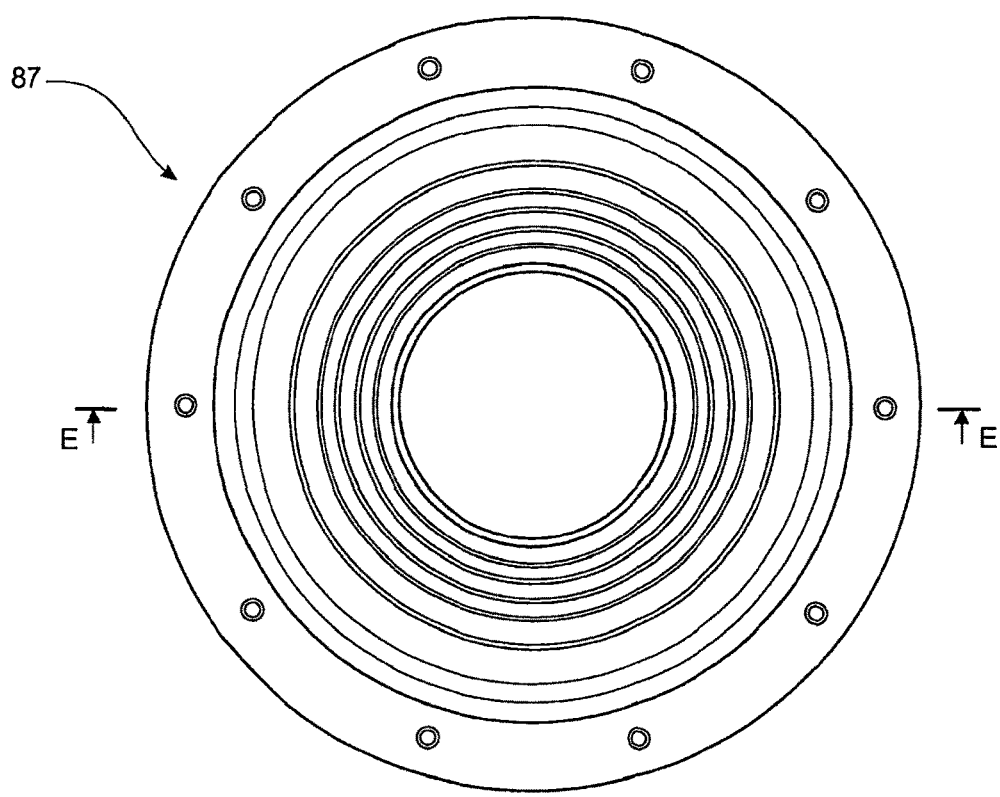
FIG. 30 shows a further embodiment in plan view of a two part sealing gland.

Another form of labyrinth seal is shown in FIG. 20b. This form relies upon at least one extending seal lip 48 of a rib form on one opposing complimentary mating surface 39 and at least one complimentary seal recess 49 on the other opposing complimentary mating surface 39. In the preferred embodiment there are at least two of each.

Other forms of labyrinth may be used that are known in the art and are considered to be immaterial variants of those examples shown.

A further embodiment of the present invention will now be described with reference to FIGS. 22 through 29. The sealing gland 60 consists of a sealing body 63 and a compression ring 68. The sealing body 63 is a substantially planar disc shaped member. On the underside of the planar sealing body 63 is at least one endless lip seal 65 (best shown in FIG. 29). In the preferred embodiment there are four such endless lip seals 65, concentrically arranged. At or near the periphery 67 of the planar sealing body 63 is a first plurality of holes 66. In the preferred embodiment these are equally spaced around the periphery 67 of the planar sealing body. The plurality of holes 66 have diameter(s) such that when a fastener is passed there through an interference fit will be created. In the preferred embodiment this interference fit (i.e. a seal being created between the hole and the fastener 71) may be formed either by the size of the apertures being slightly less that of the fastener put there through or may be formed once the gland is assembled and compressed by the compression ring 68. The compression of the material of the gland 60 between the substantially flat surface and the compression ring 68 causing bulging or swelling of the material to seal about the fastener 71. The compression ring 68 can either simply fit on the top side of the sealing gland 60 (FIG. 23b) or alternatively may be retained there by a retention lip 73. The retention lip 73 rises up from the body of the planar sealing body 63 to overlap at least in part the compression ring 68. The apertures of the compression ring 68 and the apertures of the planar sealing body 63 at least in some parts line up so that fasteners can be located there through to engage with the substantially flat surface underneath.

In assembling this embodiment the sealing gland 60 is passed over the elongate member 61 and brought to bear with the endless lip seals 65 against the substantially flat surface 62. Fasteners are then located through the apertures to the substantially flat surface 62 and tightened to sufficiently compress the material of the planar sealing body 63 under the compression ring 68 and also the endless lip members 65 to seal against the substantially flat surface. The sealing aperture 74 is either pre-cut into the supplied unit before its use or may be cut by a user immediately prior to installation or as required for the uses of the sealing gland 60. To aid this cutting by the user (or indeed manufacture prior to supply to the user) a series of concentric indications 75 are on the inner portion of the planar sealing body 63. These may either be rises, detents or simply printed thereon. In the shown embodiment they are circular as is the planar sealing body. However in other embodiments the planar sealing body and therefore the sealing gland may have an overall plan shape that is not circular (e.g. a polygon of three or more sides) and or the sealing aperture 74 may be other than circular depending upon the shape of the elongate member to be sealed to. Therefore the concentric indications 75 may also be of this shape other than circular (e.g. triangular, square or rectangular).

When the sealing gland 60 is applied over the elongate member the sides of the sealing aperture 74 are slightly less in size than the overall size of the elongate member. This results in elastic deformation of the periphery of the sealing aperture 74 and forms a seal about the elongate member. This has been earlier described in the other embodiments. In other methods of installation the sealing gland 60 may be mounted to the substantially flat surface 62 and then the elongate member 63 is passed though the appropriate formed sealing aperture 74.

The material of this embodiment is similar to that of the previous embodiments in that it is a thermally resistant, or chemically resistant, or fire retardant, (or all of these) material, for example a high grade silicone. The material must also possess an inherent elastic nature to allow the deformation of the endless lips seals 65 and also the elastic deformation about the elongate member in the sealing aperture 74.

Figure 31:
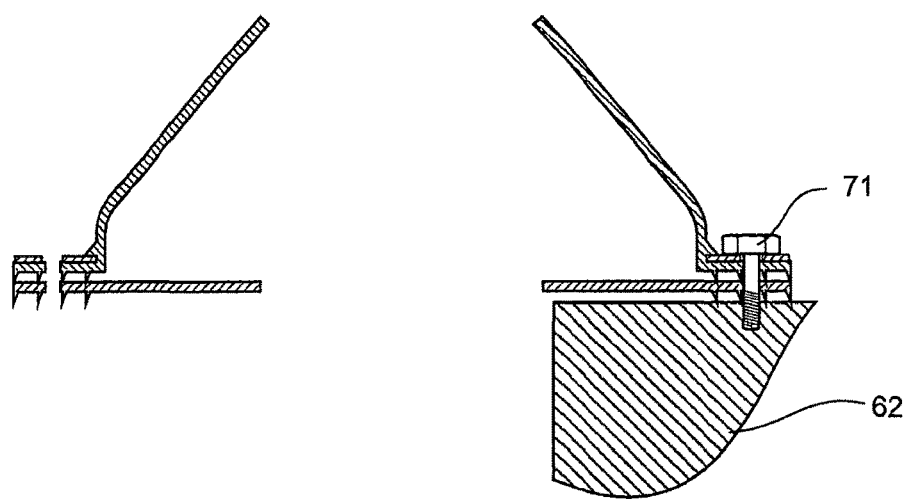
FIG. 31 shows a cross-sectional view along line E-E of FIG. 30 showing the two part make up of the sealing gland with a compression ring in place.
Figure 32:
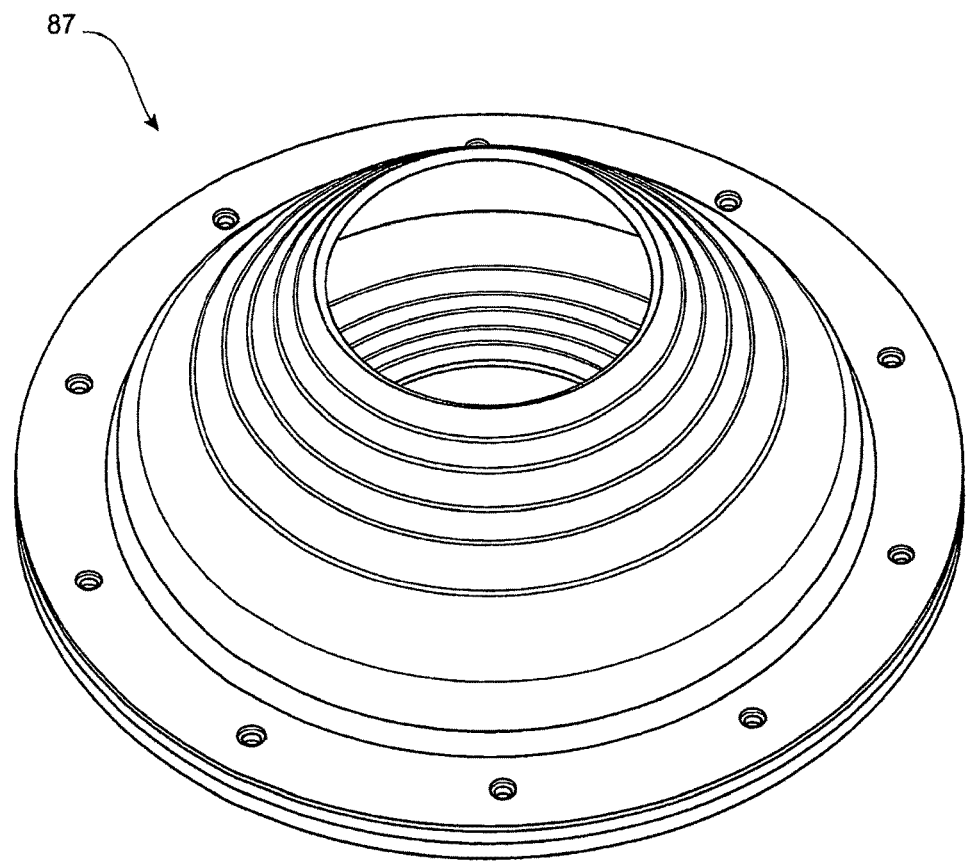
FIG. 32 shows a top isometric view of the two part sealing gland with a compression ring in place.
Figure 33:
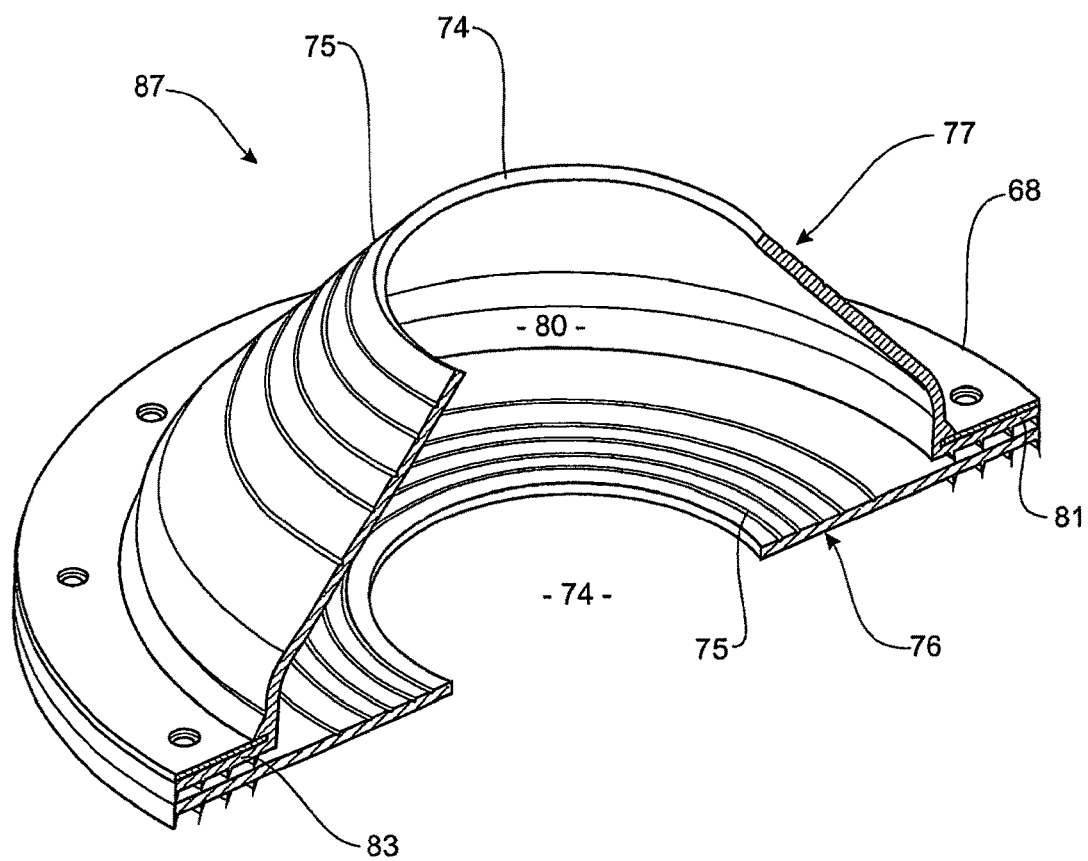
FIG. 33 shows an isometric sectional view along line E-E of FIG. 30.
Figure 34:
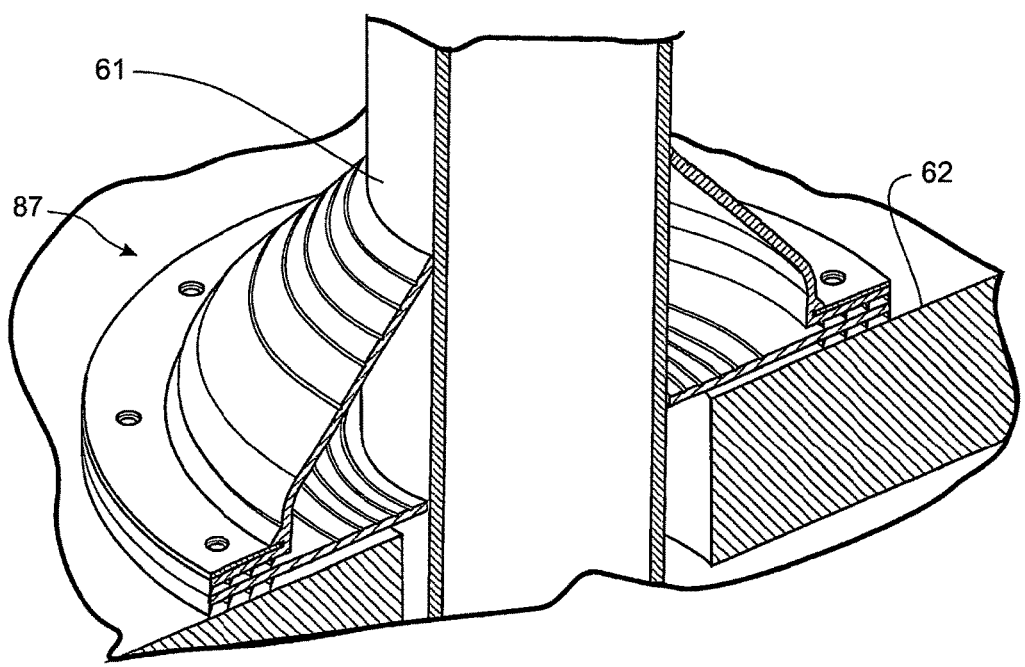
FIG. 34 shows the cross section of FIG. 33 with the inclusion of the flat surface provided by a wall and the elongate member (such as a pipe) and the sealing gland sealing therebetween.

A further embodiment of the present invention is shown in FIGS. 31 through 33. In its most simplest form this embodiment combines the sealing gland of the previous embodiment shown in FIGS. 21 through 29 and the sealing gland shown as the first embodiment in FIGS. 1 through 9. This composite construction serves a primary purpose. In the event of an extreme fire event one or other of the sealing glands, i.e. the inner sealing body 76 and the outer sealing body 77, may become extremely charred and therefore become brittle. When fire suppression measures, for example foam, water, or similar are used these may impinge on the charred sealing body. Due to the brittle nature of the charred sealing body it may fall away. If only one of these sealing bodies were present then in effect the sealing of the elongate member to the flat surface would fail. By having the presence of the second sealing body then this is left largely unscathed by the fire event and can therefore still effect the sealing of the elongate member to the substantially flat surface.

The outer sealing body 77 as earlier described has a tapered skirt or frustoconical inner sealing portion 80 which is then surrounded by an outer sealing body flange 81. As earlier described the axial cross section of the tapered skirt 80, sealing aperture or flange 81 plan may be other than circular and may be any multisided polygon in shape, whether regular or otherwise. In some embodiments it is envisaged that a mixture of cross sections may be present, e.g. circular base flange 81, square tapered skirt 80, and rectangular sealing aperture 74.

The outer sealing body flange 81 runs all the way around the tapered skirt or frustoconical inner sealing portion 80. In the preferred embodiment the outer sealing body 77 is a unitary body made from the same or similar material mentioned above with the same or similar properties. For example it may be made from a high grade silicone.

Present also is a compression ring 68 which bears on the top side 83 of the outer sealing body flange 81. Located "underneath" the outer sealing body 77 is the inner sealing body 76. This is largely the same as the planar sealing body 63 embodiment described in reference to FIGS. 22 through 29. However the inner sealing body 76 in the preferred embodiment here does not have a retention lip 73 present. Both the inner sealing body 76 and the outer sealing body 77 have a number of endless lip seals 65 depending from their under surfaces about the flange. The compression ring 68, outer sealing body flange 81 and inner sealing body flange have matched or co-axial apertures running there through for the receiving of the fasteners 71.

As can be seen at least in FIG. 33 the inner sealing body 76 periphery shows outside the outer sealing body 77. In the preferred embodiment the periphery of the inner sealing body 76 and in the most preferred embodiment the entire inner sealing body is of a different coloured material to that of the outer sealing body 77. In the preferred embodiment this colour is red. The material itself is identical it is the visual indication or colour that is different. The reason for this is that a user can immediately tell whether or not an inner sealing body and therefore a sealing gland 87 of this embodiment, has been installed that has the necessary fire retardant properties by virtue of the fact of having the composite sealing gland 87.

In use the sealing gland 87 is located about an elongate member 61 either separately or as a unit and is slid down to lie against the flat surface 62. If necessary prior to this assembly the sealing aperture 74 is cut to size. This can be aided by the presence of concentric indications 75 on each of the inner sealing bodies 76 and outer sealing body 77. As earlier described the outer sealing body 77 sealing aperture 74 may be created by the cutting of line through a peaked or coned version of the outer sealing body 77. Once the correct size is chosen the sealing gland 87 (either separately or together) is slid down over the elongate member 61. Thereafter fasteners 71 are passed through the apertures to engage with the flat surface. Tension is then applied via the fasteners to the compression plate 68 itself. This will in turn compress the endless lip seals 65 of each of the inner sealing body 76 and outer sealing body 77. This will affect the seal between the outer sealing body and inner sealing body, and the inner sealing body and the flat surface. In alternative methods the sealing gland 87 is applied first and thereafter the elongate member is passed through the sealing apertures 74 of the sealing gland 87.

The seal about the elongate member is achieved in similar ways earlier described in that it is elastic deformation of the sealing body form the seal about the elongate member. This perhaps is best shown in FIG. 31 immediately prior to applying of compression by the fasteners 71 to deform the endless lip seals 65 to affect the seal.

The foregoing description of the invention includes preferred forms thereof. Modifications may be made thereto without departing from the scope of the invention.

What is claimed is:

1. A peripheral sealing gland configured to form a seal, between an elongate member and a substantially flat surface having an aperture into which the elongate member extends, the peripheral sealing gland comprising:
   an at least in part frustoconical shaped skirt through which the elongate member is to pass and defining, at an upper periphery of the skirt, a deformable upper seal configured to deform about and form a first seal to a periphery of the elongate member;
   a flange having an inner surface and an outer surface, the flange integrally formed with the skirt and depending from a lower periphery of the skirt, the flange having two or more concentrically arranged endless lip seals extending from the inner surface, and a plurality of flange apertures;

a ring configured to bear on the outer surface of the flange, so as to apply a pressure to the two or more endless lip seals to form a second seal against the flat surface when the ring is fastened to the substantially flat surface by fasteners to capture the flange therebetween, the ring having a plurality of ring apertures corresponding to, and co-locatable with, at least some of the flange apertures to receive the fasteners;

a resealable split extending from the upper seal to a peripheral edge of the flange; and a compression clamp configured to close the resealable split to form the first seal, the compression clamp comprising:
　at least a first connection member and a second connection member;
　a first rail coupled to both the first connection member and the second connection member and configured to continuously extend along a first external surface of a first side of the resealable split between the first connection member and the second connection member; and
　a second rail coupled to both the first connection member and the second connection member and configured to continuously extend along a second external surface of a second side of the resealable split between the first connection member and the second connection member;

wherein the first rail applies a first pressure to seal the resealable split;

wherein the second rail applies a second pressure to seal the resealable split; and wherein the first side of the resealable split opposes the second side of the resealable split.

2. The peripheral sealing gland of claim 1, wherein the sealing gland is structured to fit to the elongate member and the substantially flat surface by opening the resealable split and sliding the sealing gland laterally over the elongate member.

3. The peripheral sealing gland of claim 1, further comprising a continuous upstand depending outward from the skirt on each of the first side of the resealable split and the second side of the resealable split.

4. The peripheral sealing gland of claim 1, wherein the resealable split includes mating surfaces that are complementary and configured to form the first seal when resealed, and wherein the compression clamp is configured to mate the mating surfaces to close the resealable split.

5. The peripheral sealing gland of claim 4, wherein the resealable split includes an undercut running along each of the first external surface and the second external surface; and
　wherein the first external surface and the second external surface are opposed to the mating surfaces.

6. The peripheral sealing gland of claim 5, wherein the compression clamp is configured to apply a third pressure to either the first side of the resealable split or the second side of the resealable split by continuous contact at the undercut.

7. The peripheral sealing gland of claim 1, wherein the ring is split to under engage and apply sealing pressure at least along part of the resealable split on the flange.

8. The peripheral sealing gland of claim 1, wherein the flange comprises a silicone material.

9. The peripheral sealing gland of claim 1, wherein the ring and the compression clamp are made from a stainless steel.

10. A peripheral sealing gland configured to form a seal, between an elongate member and a substantially flat surface having an aperture into which the elongate member extends, the peripheral sealing gland comprising:

an at least in part frustoconical shaped skirt through which the elongate member is to pass and defining, at an upper periphery of the skirt, a deformable upper seal configured to deform about and form a first seal to a periphery of the elongate member;

a flange having an inner surface and an outer surface, the flange integrally formed with the skirt and depending from a lower periphery of the skirt, the flange having two or more concentrically arranged endless lip seals extending from the inner surface, and a plurality of flange apertures;

a ring configured to bear on the outer surface of the flange, so as to apply a first pressure to the two or more endless lip seals to form a second seal against the flat surface when the ring is fastened to the substantially flat surface by fasteners to capture the flange therebetween, the ring having a plurality of ring apertures corresponding to, and co-locatable with, at least some of the flange apertures to receive the fasteners;

a resealable split extending from the upper seal of the skirt to a peripheral edge of the flange;

continuous upstands depending outwards from the skirt on each of a first side of the resealable split and a second side of the resealable split, the continuous upstands running along the entire length of the resealable split; and a compression clamp comprising:
　at least a first connection member and a second connection member;
　a first rail coupled to both the first connection member and the second connection member and configured to continuously extend along a first external surface of the first side of the resealable split between the first connection member and the second connection member; and
　a second rail coupled to both the first connection member and the second connection member and configured to continuously extend along a second external surface of the second side of the resealable split between the first connection member and the second connection member;

wherein the first rail applies a second pressure to seal the resealable split;

wherein the second rail applies a third pressure to seal the resealable split; and wherein the first side of the resealable split opposes the second side the resealable split.

11. The peripheral sealing gland of claim 10, wherein the continuous upstands include mating surfaces that are complementary to form the first seal when the resealable split is resealed.

12. The peripheral sealing gland of claim 11, wherein the compression clamp is configured to form the first seal between the skirt and the elongate member by applying the sealing pressure to mate the mating surfaces and close the resealable split.

13. The peripheral sealing gland of claim 12, further comprising undercuts formed in each of the continuous upstands, the undercuts structured to receive the compression clamp, the compression clamp configured to apply the sealing pressure to either the first side of the resealable split or the second side of the resealable split by continuous contact at the undercuts.

14. The peripheral sealing gland of claim 13, wherein each of the at least two pressure application surfaces are presented from a pressure application member, each of the pressure application members being joined by the first connection member and the second connection member, the compression clamp applying a continuous sealing pressure along the length of the resealable split by the pressure application surfaces engaging with each of the undercuts.

15. A peripheral sealing gland to form a seal, between an elongate member and a substantially flat surface having an aperture into which the elongate member extends, the peripheral sealing gland comprising:
   an at least in part frustoconical shaped skirt through which the elongate member is to pass and defining at an upper periphery of the skirt, a deformable upper seal configured to deform about and form a first seal to a periphery of the elongate member,
   a flange integrally formed with the skirt and having an outer surface and an inner surface, the flange depending from a lower periphery of the skirt, the flange including two or more concentrically arranged endless lip seals extending from the inner surface, and having a plurality of flange apertures disposed entirely between consecutive ones of the endless lip seals;
   a ring having a plurality of ring apertures, the ring apertures corresponding to, and co-locatable with, at least some of the flange apertures, the ring able to bear on the outer surface of the flange, so as to apply a first pressure to the endless lip seals to form a second seal against the flat surface when the ring is fastened to the substantially flat surface by fasteners to capture the flange therebetween; and
   a resealable split extending from the upper seal to a peripheral edge of the flange;
   the skirt having, toward the flange, a retention flange forming a circumferential pocket to removably receive the ring and to permit adjustment of the ring relative to the flange to co-locate the flange apertures with the ring apertures;
   wherein a diameter of the flange apertures is smaller than a diameter of the ring apertures, so that the flange is configured to form, at the flange apertures, a third seal against the fasteners;
   a compression clamp configured to close the resealable split to form a first seal, the compression clamp comprising:
      at least a first connection member and a second connection member;
      a first rail coupled to both the first connection member and the second connection member and configured to continuously extend along a first external surface of a first side of the resealable split between the first connection member and the second connection member; and
      a second rail coupled to both the first connection member and the second connection member and configured to continuously extend along a second external surface of a second side of the resealable split between the first connection member and the second connection member;
   wherein the first rail applies a second pressure to seal the resealable split;
   wherein the second rail applies a third pressure to seal the resealable split; and
   wherein the first side of the resealable split opposes the second side of the resealable split.

16. The peripheral sealing gland of claim 15, wherein the sealing gland is structured to fit to the elongate member and the substantially flat surface by opening the resealable split and sliding the sealing gland laterally over the elongate member.

17. The peripheral sealing gland of claim 16, further comprising a continuous upstand depending outwards from the skirt on each of the first side of the resealable split and the second side of the resealable split.

18. The peripheral sealing gland of claim 15, wherein the resealable split includes mating surfaces that are complementary to form the first seal when resealed.

19. The peripheral sealing gland of claim 18, further comprising an undercut running along each of the first external surface and the second external surface; and
   wherein the first external and the second external surface are opposed to the mating surfaces.

* * * * *